United States Patent
Lee

(10) Patent No.: US 12,550,168 B2
(45) Date of Patent: Feb. 10, 2026

(54) METHOD AND DEVICE FOR SUPPORTING CROSS CARRIER SCHEDULING OF NR SL

(71) Applicant: LG Electronics Inc., Seoul (KR)

(72) Inventor: Seungmin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 442 days.

(21) Appl. No.: 18/023,215

(22) PCT Filed: Aug. 24, 2021

(86) PCT No.: PCT/KR2021/011259
§ 371 (c)(1),
(2) Date: Feb. 24, 2023

(87) PCT Pub. No.: WO2022/045720
PCT Pub. Date: Mar. 3, 2022

(65) Prior Publication Data
US 2023/0337261 A1 Oct. 19, 2023

Related U.S. Application Data

(60) Provisional application No. 63/069,682, filed on Aug. 24, 2020.

(51) Int. Cl.
*H04W 72/40* (2023.01)
*H04W 72/232* (2023.01)

(52) U.S. Cl.
CPC ......... *H04W 72/40* (2023.01); *H04W 72/232* (2023.01)

(58) Field of Classification Search
CPC . H04W 72/40; H04W 72/232; H04W 72/231; H04W 72/0446; H04W 92/18;
(Continued)

(56) References Cited

U.S. PATENT DOCUMENTS

| 11,071,172 B2* | 7/2021 | He | H04W 52/0251 |
| 2016/0112977 A1* | 4/2016 | Byun | H04W 72/541 |
| | | | 370/350 |
| 2020/0396744 A1* | 12/2020 | Xiong | H04L 27/2636 |

FOREIGN PATENT DOCUMENTS

| EP | 2490495 | 8/2012 |
| KR | 10-2012-0068968 | 6/2012 |

(Continued)

OTHER PUBLICATIONS

Ericsson, "Open issue for NR Uu controlling LTE sidelink transmissions," R1-2006441 (Revision of R1-2004550), Presented at 3GPP TSG-RAN WG1 Meeting #102-e, e-Meeting, Aug. 17-28, 2020, 3 pages.

(Continued)

*Primary Examiner* — Wei Zhao
(74) *Attorney, Agent, or Firm* — Fish & Richardson P.C.

(57) ABSTRACT

Proposed is a method for a first device to perform wireless communication. The method may comprise the steps of: determining a search space related to downlink control information (DCI) on the basis of a pre-configured carrier indication field (CIF) value; monitoring at least one physical downlink control channel (PDCCH) candidate within the search space; receiving the DCI on the basis of the monitoring; and performing sidelink (SL) communication with a second device on the basis of a SL resource scheduled by the DCI.

20 Claims, 21 Drawing Sheets

(58) Field of Classification Search
CPC .. H04W 72/25; H04W 72/02; H04W 72/1215
See application file for complete search history.

(56) References Cited

FOREIGN PATENT DOCUMENTS

| KR | 10-2019-0029483 | 3/2019 |
| KR | 10-2019-0073345 | 6/2019 |
| WO | WO2018081976 | 5/2018 |

OTHER PUBLICATIONS

International Search Report and Written Opinion in International Appln. No. PCT/KR2021/011259, mailed on Nov. 18, 2021, 9 pages (with English translation).
Vivo, "Remaining issues on mode 1 resource allocation mechanism," R1-2005339, Presented at 3GPP TSG RAN WG #102-e, e-Meeting, Aug. 17-28, 2020, 14 pages.

\* cited by examiner

FIG. 10
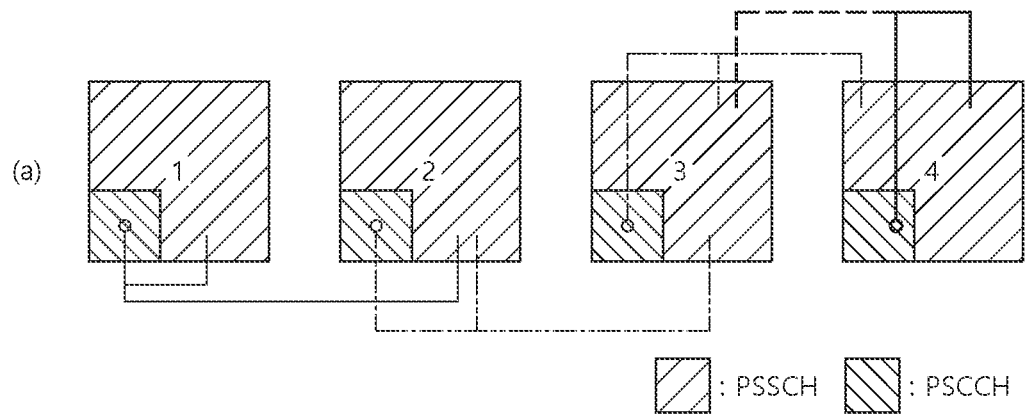
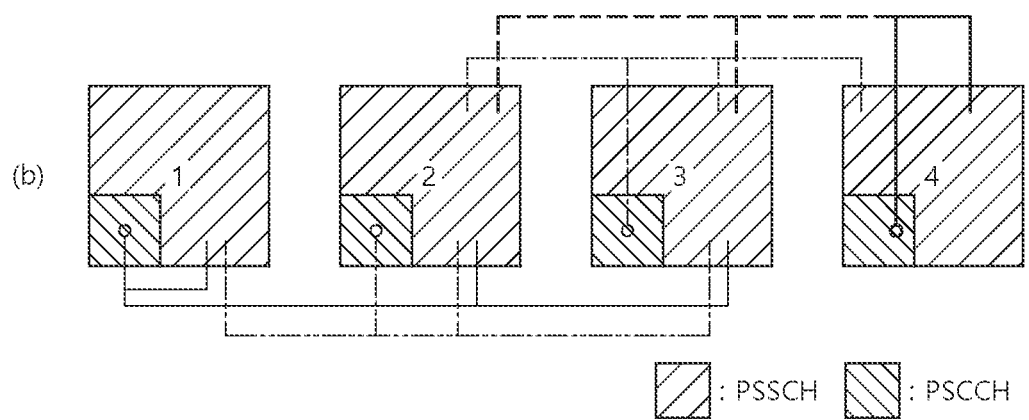
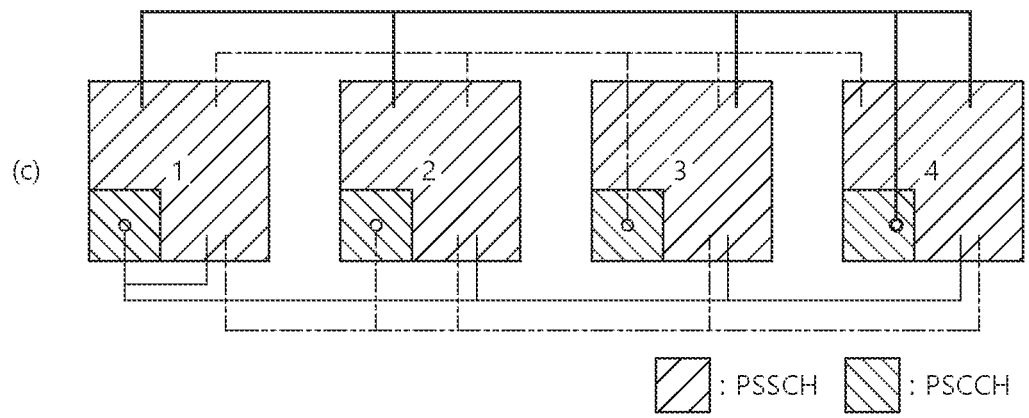

FIG. 15 perform SL communication with first device
based on SL resource scheduled by DCI — S1510

METHOD AND DEVICE FOR SUPPORTING CROSS CARRIER SCHEDULING OF NR SL

CROSS-REFERENCE TO RELATED APPLICATIONS

This application is a National Stage application under 35 U.S.C. § 371 of International Application No. PCT/KR2021/011259, filed on Aug. 24, 2021, which claims the benefit of U.S. Provisional Application No. 63/069,682, filed on Aug. 24, 2020. The disclosures of the prior applications are incorporated by reference in their entirety.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

Thereafter, regarding V2X communication, various V2X scenarios are proposed in NR. For example, the various V2X scenarios may include vehicle platooning, advanced driving, extended sensors, remote driving, or the like.

SUMMARY

Meanwhile, in sidelink communication, the UE needs to determine a search space (SS) to receive downlink control information (DCI) related to sidelink (SL) communication. In this case, for example, if the UE receives DCI related to SL communication from a scheduling cell and performs SL communication in a scheduled cell, it may be a problem for the UE to determine an SS based on a carrier indication field (CIF) value of which cell.

In an embodiment, proposed is a method for performing wireless communication by a first device. The method may comprise: determining a search space related to downlink control information (DCI) based on a pre-configured carrier indication field (CIF) value; monitoring at least one physical downlink control channel (PDCCH) candidate in the search space; receiving the DCI based on the monitoring; and performing SL communication with a second device based on a sidelink (SL) resource scheduled by the DCI.

In an embodiment, proposed is a first device adapted to perform wireless communication. The first device may comprise: one or more memories storing instructions; one or more transceivers; and one or more processors connected to the one or more memories and the one or more transceivers, wherein the one or more processors execute the instructions to: determine a search space related to downlink control information (DCI) based on a pre-configured carrier indication field (CIF) value; monitor at least one physical downlink control channel (PDCCH) candidate in the search space; receive the DCI based on the monitoring; and perform SL communication with a second device based on a sidelink (SL) resource scheduled by the DCI.

The user equipment (UE) can efficiently perform SL communication.

BRIEF DESCRIPTION OF THE DRAWINGS

FIG. 10 shows a method in which a UE that has reserved transmission resource(s) informs another UE of the transmission resource(s), based on an embodiment of the present disclosure.

FIG. 15 shows a method for a second device to perform scheduled SL communication based on DCI with a first device, based on an embodiment of the present disclosure.

BRIEF DESCRIPTION OF THE DRAWINGS

Figure 1:
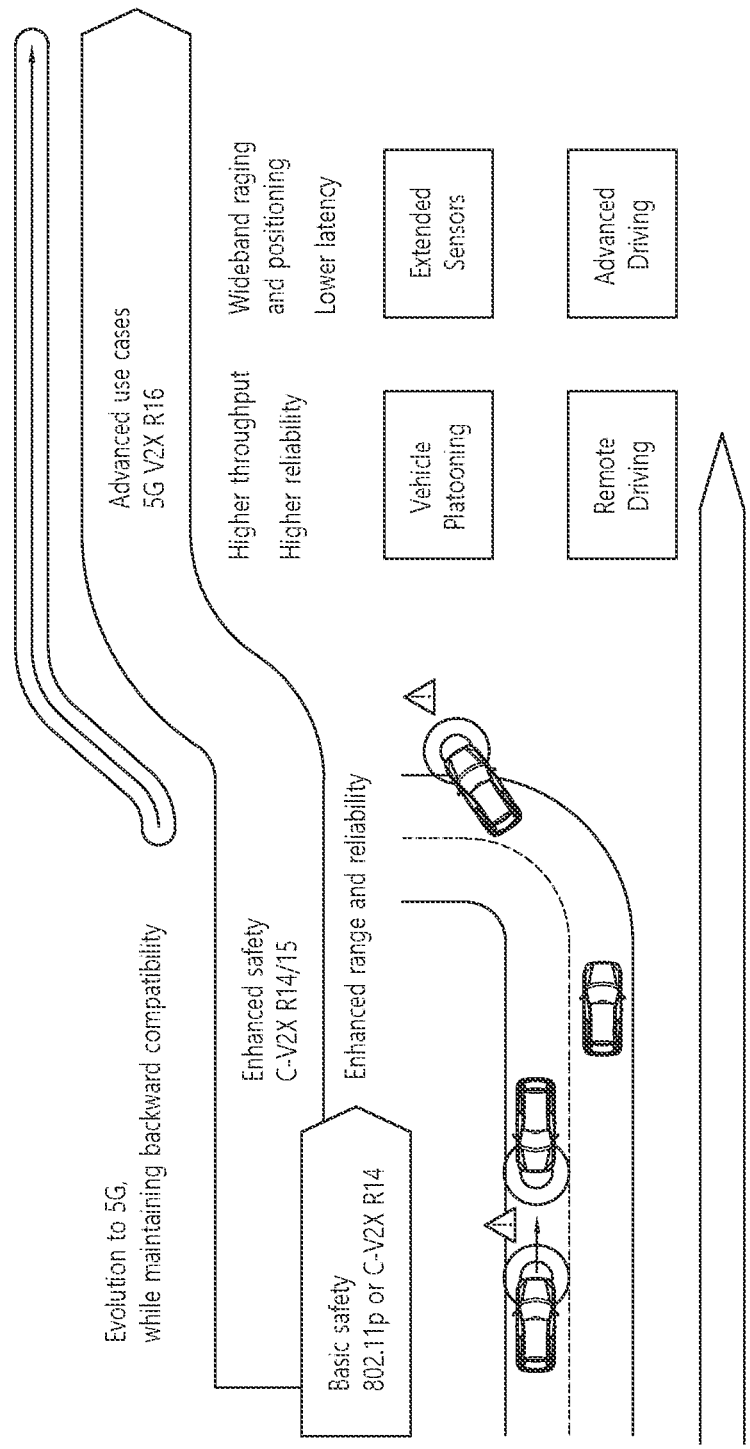
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B. C" may mean "A, B, or C".

In the present specification. "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on, 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
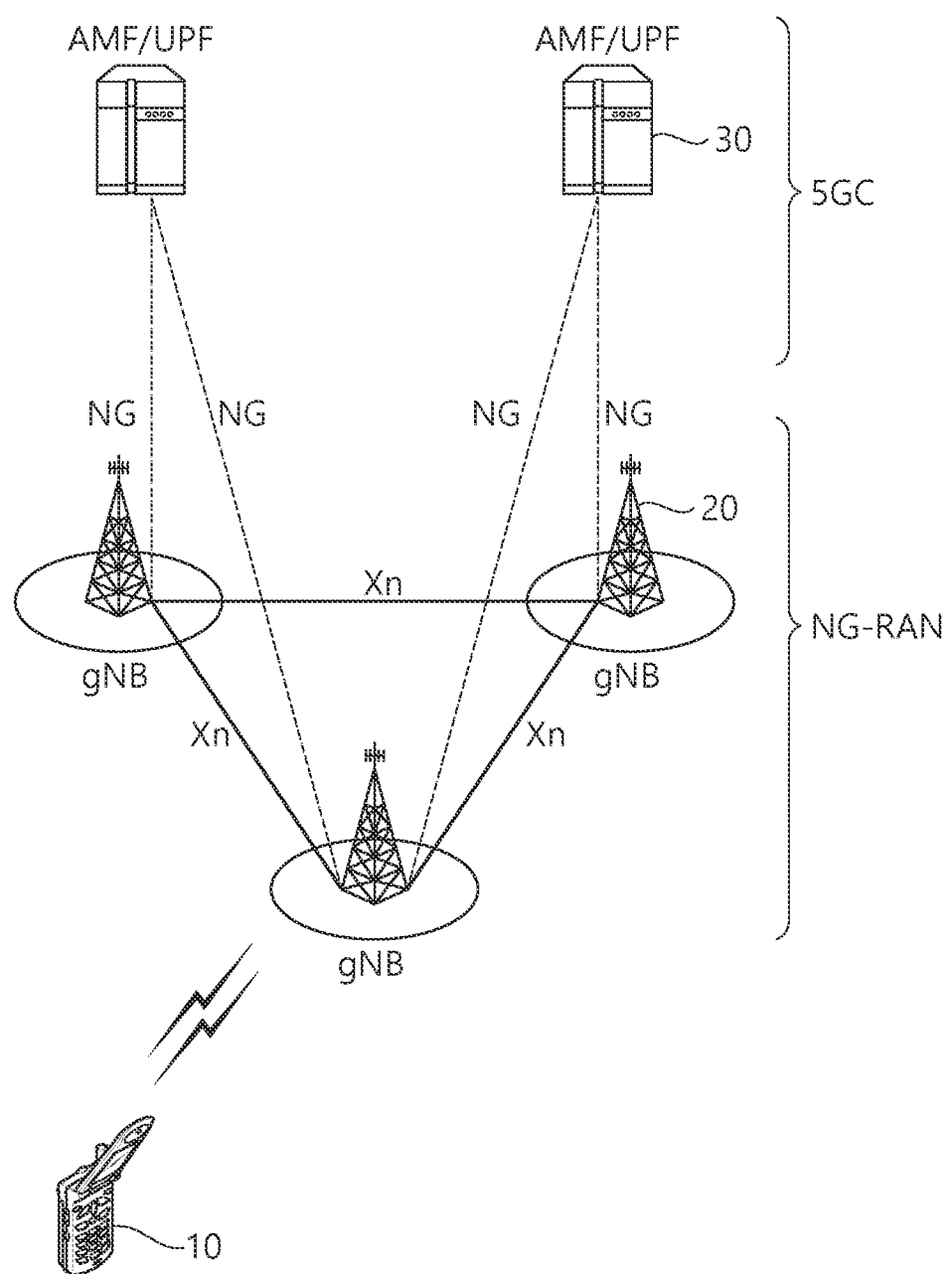
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 3:
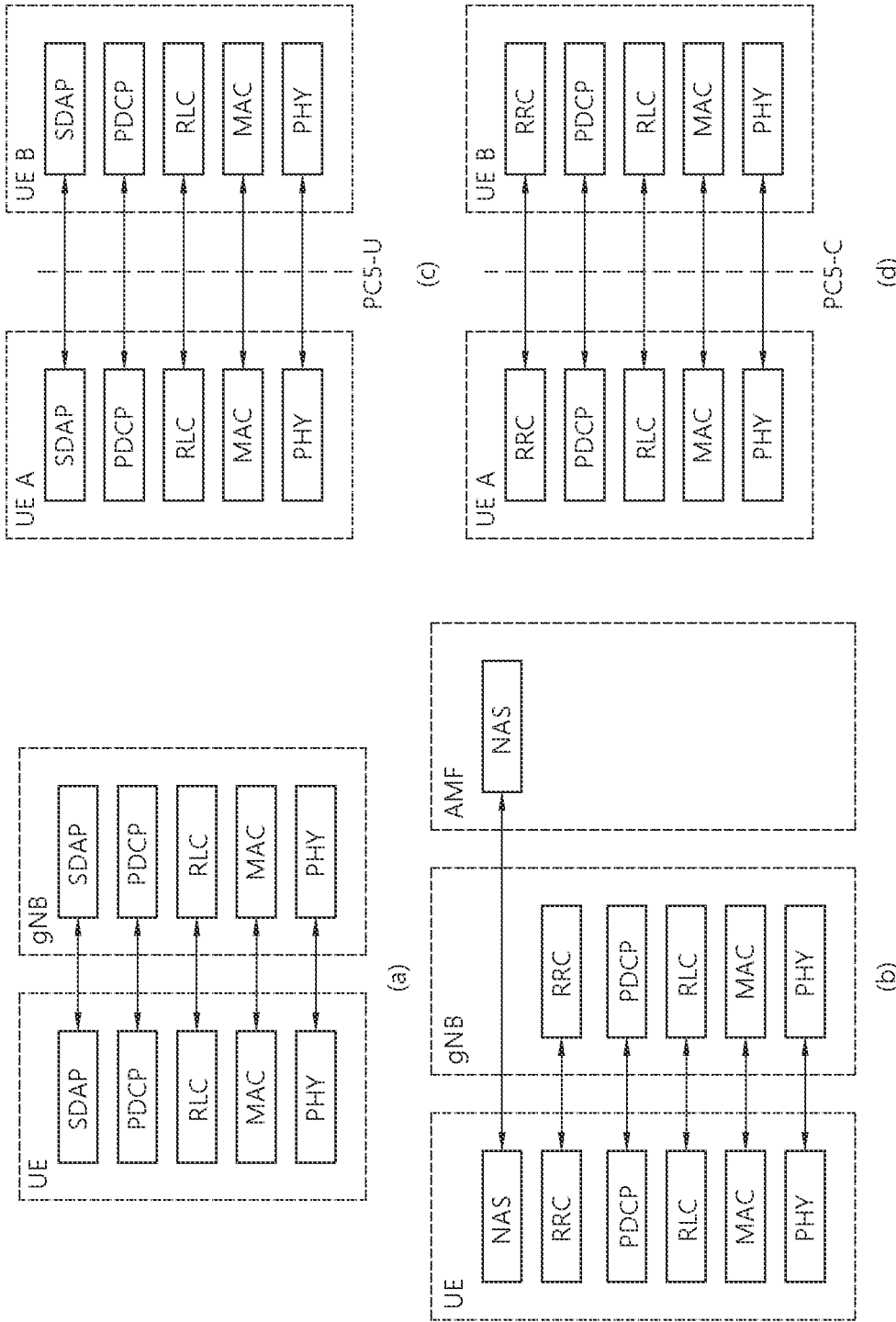
FIG. 3 shows a radio protocol architecture, based on an embodiment of the present disclosure.

FIG. 3 shows a radio protocol architecture, based on an embodiment of the present disclosure. The embodiment of FIG. 3 may be combined with various embodiments of the present disclosure. Specifically, (a) of FIG. 3 shows a radio protocol stack of a user plane for Uu communication, and (b) of FIG. 3 shows a radio protocol stack of a control plane for Uu communication. (c) of FIG. 3 shows a radio protocol stack of a user plane for SL communication, and (d) of FIG. 3 shows a radio protocol stack of a control plane for SL communication.

Referring to FIG. 3, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
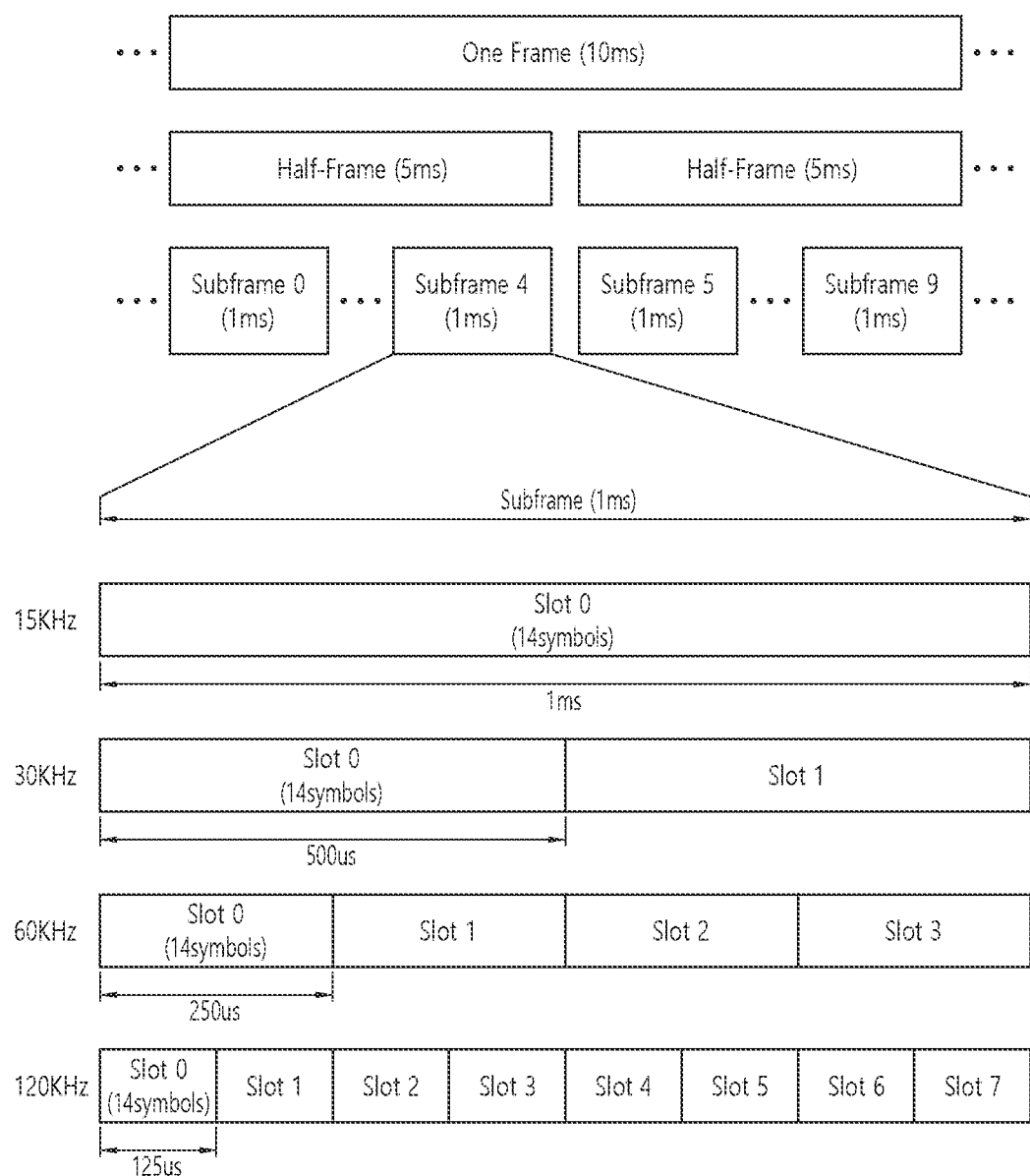
FIG. 4 shows a structure of a radio frame of an NR, based on an embodiment of the present disclosure.

FIG. 4 shows a structure of a radio frame of an NR, based on an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS (15*2$^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15*2$^u$) | $N_{symb}^{slot}$ | $N_{slot}^{frame,u}$ | $N_{slot}^{subframe,u}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 KHz |
| FR2 | 24250 MHz-52600 MHz | 60, 120, 240 KHz |

As described above, the values of the frequency ranges in the NR system may be changed (or varied). For example, as shown below in Table 4, FR1 may include a band within a range of 410 MHz to 7125 MHz. More specifically. FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 KHz |
| FR2 | 24250 MHz-52600 MHz | 60, 120, 240 KHz |

Figure 5:
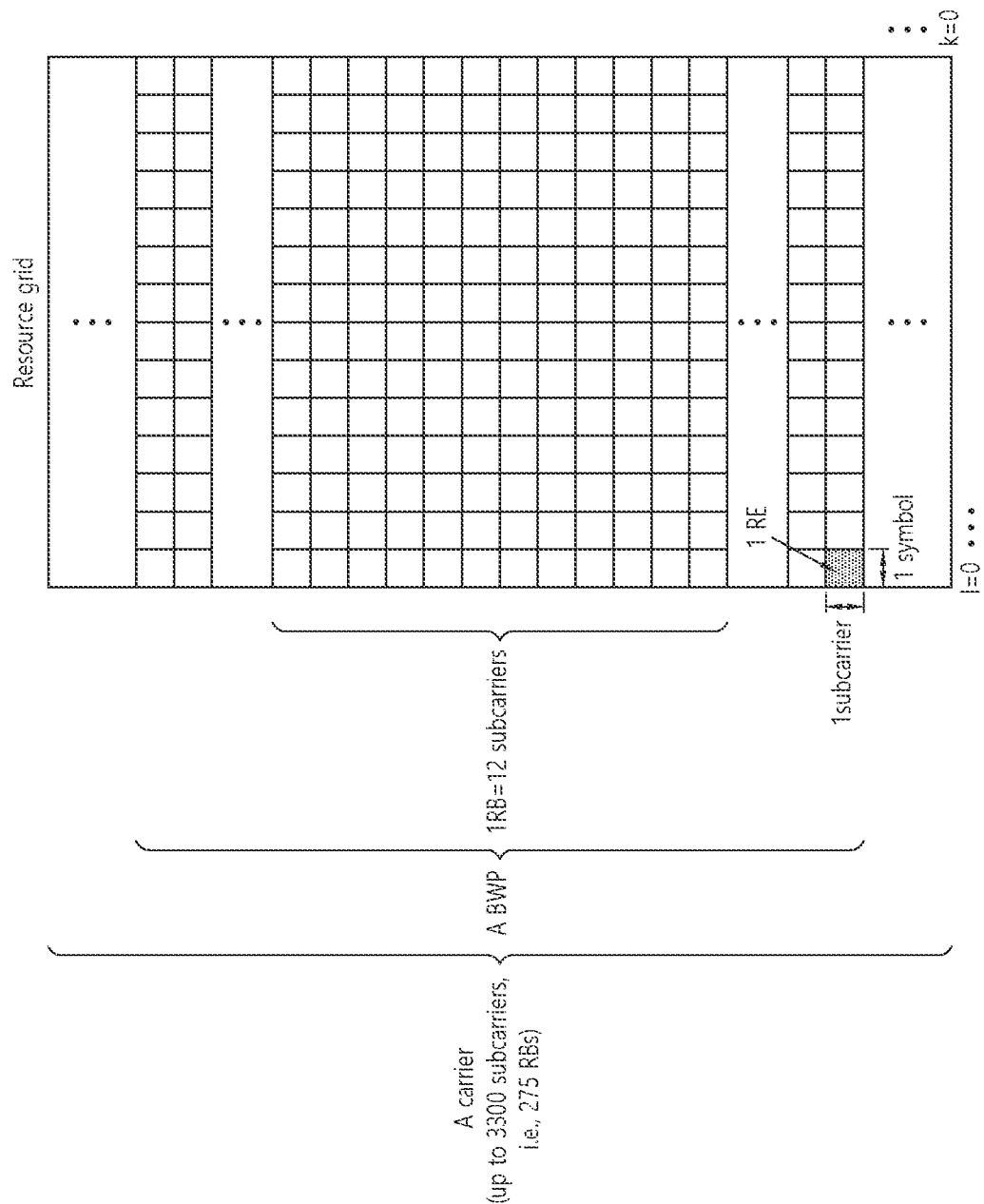
FIG. 5 shows a structure of a slot of an NR frame, based on an embodiment of the present disclosure.

FIG. 5 shows a structure of a slot of an NR frame, based on an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information—reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORE-SET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 6:
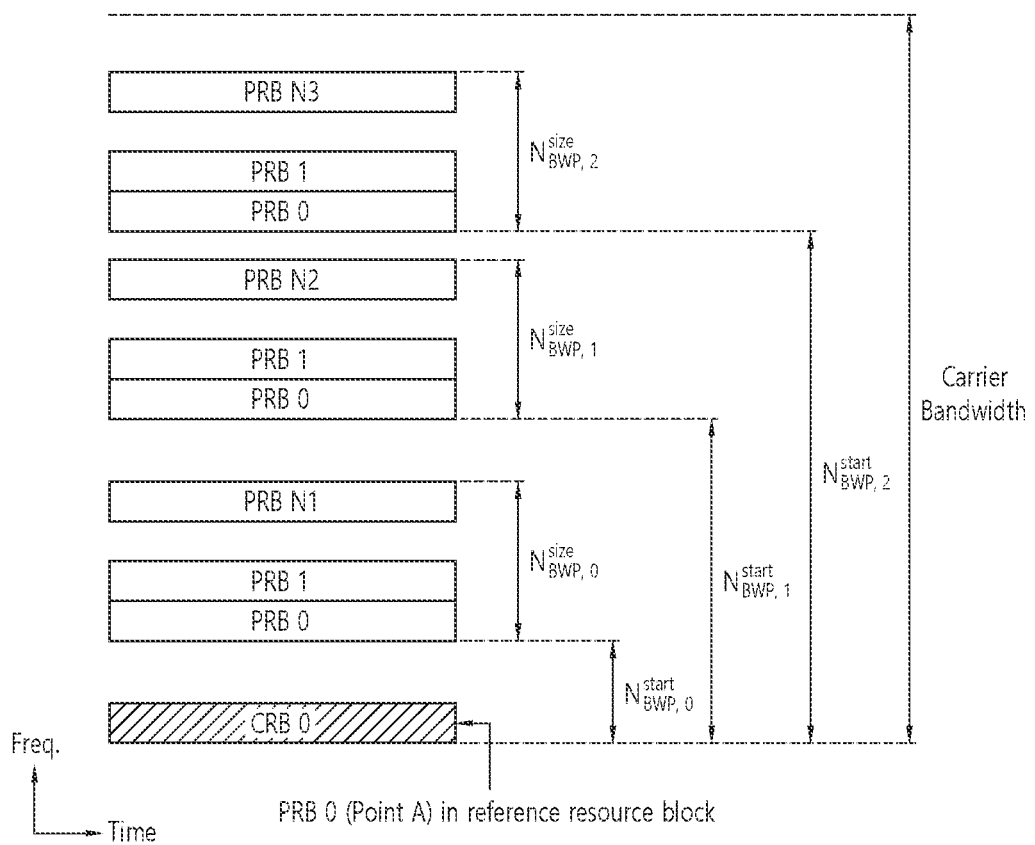
FIG. 6 shows an example of a BWP, based on an embodiment of the present disclosure.

FIG. 6 shows an example of a BWP, based on an embodiment of the present disclosure. The embodiment of FIG. 6 may be combined with various embodiments of the present disclosure. It is assumed in the embodiment of FIG. 6 that the number of BWPs is 3.

Referring to FIG. 6, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 7:
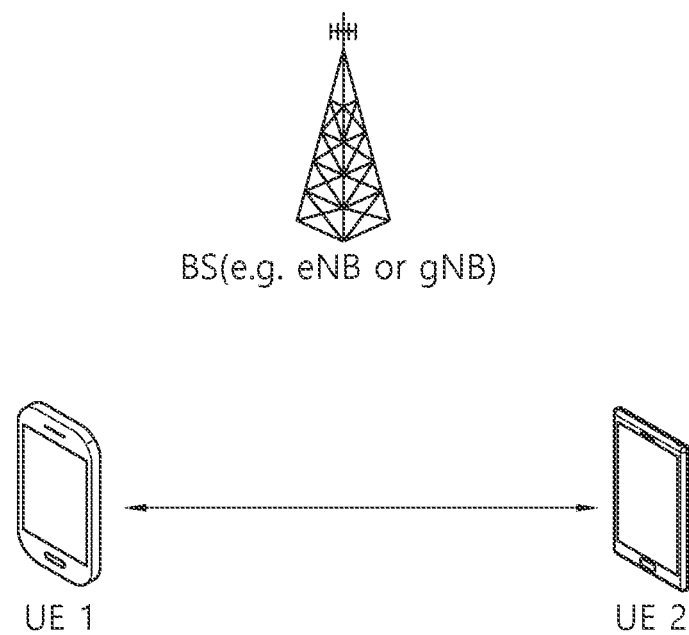
FIG. 7 shows a UE performing V2X or SL communication, based on an embodiment of the present disclosure.

FIG. 7 shows a UE performing V2X or SL communication, based on an embodiment of the present disclosure. The embodiment of FIG. 7 may be combined with various embodiments of the present disclosure.

Referring to FIG. 7, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 8:
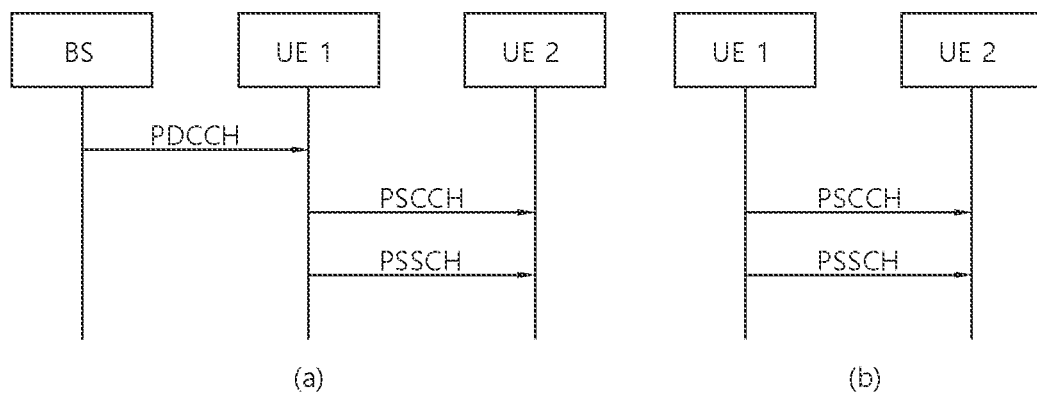
FIG. 8 shows a procedure of performing V2X or SL communication by a UE based on a transmission mode, based on an embodiment of the present disclosure.

FIG. 8 shows a procedure of performing V2X or SL communication by a UE based on a transmission mode, based on an embodiment of the present disclosure. The embodiment of FIG. 8 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 8 shows a UE operation related to an LTE transmission mode 1 or an LTE transmission mode 3. Alternatively, for example, (a) of FIG. 8 shows a UE operation related to an NR resource allocation mode 1. For example, the LTE transmission mode 1 may be applied to general SL communication, and the LTE transmission mode 3 may be applied to V2X communication.

For example, (b) of FIG. 8 shows a UE operation related to an LTE transmission mode 2 or an LTE transmission mode 4. Alternatively, for example, (b) of FIG. 8 shows a UE operation related to an NR resource allocation mode 2.

Referring to (a) of FIG. 8, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (e.g., downlink control information (DCI)) or RRC signaling (e.g., Configured Grant Type 1 or Configured Grant Type 2), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to (b) of FIG. 8, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 9:
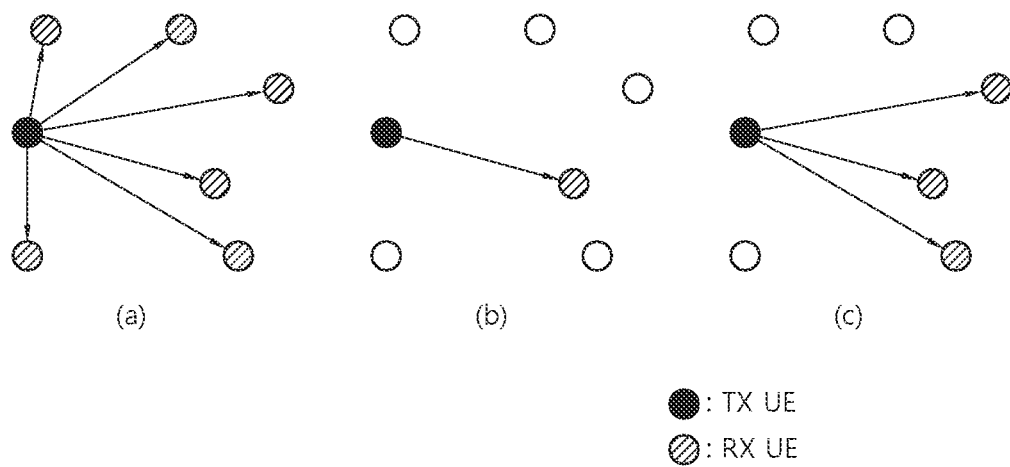
FIG. 9 shows three cast types, based on an embodiment of the present disclosure.

FIG. 9 shows three cast types, based on an embodiment of the present disclosure. The embodiment of FIG. 9 may be combined with various embodiments of the present disclosure. Specifically. (a) of FIG. 9 shows broadcast-type SL communication, (b) of FIG. 9 shows unicast type-SL communication, and (c) of FIG. 9 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in the present disclosure, for example, a transmitting UE (TX UE) may be a UE which transmits data to a (target) receiving UE (RX UE). For example, the TX UE may be a UE which performs PSCCH transmission and/or PSSCH transmission. Additionally/alternatively, for example, the TX UE may be a UE which transmits SL CSI-RS(s) and/or a SL CSI report request indicator to the (target) RX UE. Additionally/alternatively, for example, the TX UE may be a UE which transmits a (control) channel (e.g., PSCCH, PSSCH, etc.) and/or reference signal(s) on the (control) channel (e.g., DM-RS, CSI-RS, etc.), to be used for a SL radio link monitoring (RLM) operation and/or a SL radio link failure (RLF) operation of the (target) RX UE.

Meanwhile, in the present disclosure, for example, a receiving UE (RX UE) may be a UE which transmits SL HARQ feedback to a transmitting UE (TX UE) based on whether decoding of data received from the TX UE is successful and/or whether detection/decoding of a PSCCH (related to PSSCH scheduling) transmitted by the TX UE is successful. Additionally/alternatively, for example, the RX UE may be a UE which performs SL CSI transmission to the TX UE based on SL CSI-RS(s) and/or a SL CSI report request indicator received from the TX UE. Additionally/alternatively, for example, the RX UE is a UE which transmits a SL (L1) reference signal received power (RSRP) measurement value, to the TX UE, measured based on (pre-defined) reference signal(s) and/or a SL (L1) RSRP report request indicator received from the TX UE. Additionally/alternatively, for example, the RX UE may be a UE which transmits data of the RX UE to the TX UE. Additionally/alternatively, for example, the RX UE may be a UE which performs a SL RLM operation and/or a SL RLF operation based on a (pre-configured) (control) channel and/or reference signal(s) on the (control) channel received from the TX UE.

Meanwhile, in the present disclosure, for example, in case the RX UE transmits SL HARQ feedback information for a PSSCH and/or a PSCCH received from the TX UE, the following options or some of the following options may be considered. Herein, for example, the following options or some of the following options may be limitedly applied only if the RX UE successfully decodes/detects a PSCCH scheduling a PSSCH.

(1) groupcast option 1: no acknowledgement (NACK) information may be transmitted to the TX UE only if the RX UE fails to decode/receive the PSSCH received from the TX UE.

(2) groupcast option 2: If the RX UE succeeds in decoding/receiving the PSSCH received from the TX UE, ACK information may be transmitted to the TX UE, and if the RX UE fails to decode/receive the PSSCH, NACK information may be transmitted to the TX UE.

Meanwhile, in the present disclosure, for example, the TX UE may transmit the following information or some of the following information to the RX UE through SCI(s). Herein, for example, the TX UE may transmit some or all of the following information to the RX UE through a first SCI and/or a second SCI.

- PSSCH (and/or PSCCH) related resource allocation information (e.g., the location/number of time/frequency resources, resource reservation information (e.g., period))
- SL CSI report request indicator or SL (L1) reference signal received power (RSRP) (and/or SL (L1) reference signal received quality (RSRQ) and/or SL (L1) reference signal strength indicator (RSSI)) report request indicator
- SL CSI transmission indicator (or SL (L1) RSRP (and/or SL (L1) RSRQ and/or SL (L1) RSSI) information transmission indicator) (on a PSSCH)
- Modulation and Coding Scheme (MCS) information
- TX power information
- L1 destination ID information and/or L1 source ID information
- SL HARQ process ID information
- New Data Indicator (NDI) information
- Redundancy Version (RV) information
- (Transmission traffic/packet related) QoS information (e.g., priority information)
- SL CSI-RS transmission indicator or information on the number of antenna ports for (transmitting) SL CSI-RS
- TX UE location information or location (or distance range) information of the target RX UE (for which SL HARQ feedback is requested)
- Reference signal (e.g., DM-RS, etc.) information related to decoding (and/or channel estimation) of data transmitted through a PSSCH. For example, information related to a pattern of (time-frequency) mapping resources of DM-RS(s), RANK information, antenna port index information, information on the number of antenna ports, etc.

Meanwhile, in the present disclosure, for example, since the TX UE may transmit a SCI, a first SCI and/or a second SCI to the RX UE through a PSCCH, the PSCCH may be replaced/substituted with the SCI and/or the first SCI and/or the second SCI. Additionally/alternatively, the SCI may be replaced/substituted with the PSCCH and/or the first SCI and/or the second SCI. Additionally/alternatively, for example, since the TX UE may transmit a second SCI to the RX UE through a PSSCH, the PSSCH may be replaced/substituted with the second SCI.

Meanwhile, in the present disclosure, for example, if SCI configuration fields are divided into two groups in consideration of a (relatively) high SCI payload size, the first SCI including a first SCI configuration field group may be referred to as a $1^{st}$ SCI, and the second SCI including a second SCI configuration field group may be referred to as a $2^{nd}$ SCI. Also, for example, the $1^{st}$ SCI may be transmitted to the receiving UE through a PSCCH. Also, for example, the $2^{nd}$ SCI may be transmitted to the receiving UE through a (independent) PSCCH or may be piggybacked and transmitted together with data through a PSSCH.

Meanwhile, in the present disclosure, for example, the term "configure/configured" or the term "define/defined" may refer to (pre)configuration from a base station or a network (through pre-defined signaling (e.g., SIB, MAC, RRC, etc.)) (for each resource pool).

Meanwhile, in the present disclosure, for example, since an RLF may be determined based on out-of-synch (OOS) indicator(s) or in-synch (IS) indicator(s), the RLF may be replaced/substituted with out-of-synch (OOS) indicator(s) or in-synch (IS) indicator(s).

Meanwhile, in the present disclosure, for example, an RB may be replaced/substituted with a subcarrier. Also, in the present disclosure, for example, a packet or a traffic may be replaced/substituted with a TB or a MAC PDU based on a transmission layer.

Meanwhile, in the present disclosure, a CBG may be replaced/substituted with a TB.

Meanwhile, in the present disclosure, for example, a source ID may be replaced/substituted with a destination ID.

Meanwhile, in the present disclosure, for example, an L1 ID may be replaced/substituted with an L2 ID. For example, the L1 ID may be an L1 source ID or an L1 destination ID. For example, the L2 ID may be an L2 source ID or an L2 destination ID.

Meanwhile, in the present disclosure, for example, an operation of the transmitting UE to reserve/select/determine retransmission resource(s) may include: an operation of the transmitting UE to reserve/select/determine potential retransmission resource(s) for which actual use will be determined based on SL HARQ feedback information received from the receiving UE.

Meanwhile, in the present disclosure, a sub-selection window may be replaced/substituted with a selection window and/or the pre-configured number of resource sets within the selection window, or vice versa.

Meanwhile, in the present disclosure, SL MODE 1 may refer to a resource allocation method or a communication method in which a base station directly schedules SL transmission resource(s) for a TX UE through pre-defined signaling (e.g., DCI or RRC message). For example, SL MODE 2 may refer to a resource allocation method or a communication method in which a UE independently selects SL transmission resource(s) in a resource pool pre-configured or configured from a base station or a network. For example, a UE performing SL communication based on SL MODE 1 may be referred to as a MODE 1 UE or MODE 1 TX UE, and a UE performing SL communication based on SL MODE 2 may be referred to as a MODE 2 UE or MODE 2 TX UE.

Meanwhile, in the present disclosure, for example, a dynamic grant (DG) may be replaced/substituted with a configured grant (CG) and/or a semi-persistent scheduling (SPS) grant, or vice versa. For example, the DG may be replaced/substituted with a combination of the CG and the SPS grant, or vice versa. For example, the CG may include at least one of a configured grant (CG) type 1 and/or a configured grant (CG) type 2. For example, in the CG type 1, a grant may be provided by RRC signaling and may be stored as a configured grant. For example, in the CG type 2, a grant may be provided by a PDCCH, and may be stored or deleted as a configured grant based on L1 signaling indicating activation or deactivation of the grant.

Meanwhile, in the present disclosure, a channel may be replaced/substituted with a signal, or vice versa. For example, transmission/reception of a channel may include transmission/reception of a signal. For example, transmission/reception of a signal may include transmission/reception of a channel. In addition, for example, cast may be replaced/substituted with at least one of unicast, groupcast, and/or broadcast, or vice versa. For example, a cast type may be replaced/substituted with at least one of unicast, groupcast, and/or broadcast, or vice versa.

Meanwhile, in the present disclosure, a resource may be replaced/substituted with a slot or a symbol, or vice versa. For example, the resource may include a slot and/or a symbol.

Meanwhile, in the present disclosure, a priority may be replaced/substituted with at least one of logical channel prioritization (LCP), latency, reliability, minimum required communication range, prose per-packet priority (PPPP), sidelink radio bearer (SLRB), QoS profile, QoS parameter and/or requirement, or vice versa.

Meanwhile, in various embodiments of the present disclosure, the reservation resource and/or the selection resource may be replaced/substituted with a sidelink grant (SL GRANT).

Meanwhile, in various embodiments of the present disclosure, latency may be replaced/substituted with a packet delay budget (PDB).

Meanwhile, in various embodiments of the present disclosure, a message for triggering a report on sidelink channel state information/sidelink channel quality information (hereinafter, SL_CSI information) may be replaced/substituted with a sidelink channel state information reference signal (CSI-RS) reception.

Meanwhile, in the present disclosure, blind retransmission may refer that the TX UE performs retransmission without receiving SL HARQ feedback information from the RX UE. For example, SL HARQ feedback-based retransmission may refer that the TX UE determines whether to perform retransmission based on SL HARQ feedback information received from the RX UE. For example, if the TX UE receives NACK and/or DTX information from the RX UE, the TX UE may perform retransmission to the RX UE.

Meanwhile, in the present disclosure, for example, for convenience of description, a (physical) channel used when a RX UE transmits at least one of the following information to a TX UE may be referred to as a PSFCH.

SL HARQ feedback, SL CSI, SL (L1) RSRP

Meanwhile, in the present disclosure, a Uu channel may include a UL channel and/or a DL channel. For example, the UL channel may include a PUSCH, a PUCCH, a sounding reference Signal (SRS), etc. For example, the DL channel may include a PDCCH, a PDSCH, a PSS/SSS, etc. For example, a SL channel may include a PSCCH, a PSSCH, a PSFCH, a PSBCH, a PSSS/SSSS, etc.

Meanwhile, in the present disclosure, sidelink information may include at least one of a sidelink message, a sidelink packet, a sidelink service, sidelink data, sidelink control information, and/or a sidelink transport block (TB). For example, sidelink information may be transmitted through a PSSCH and/or a PSCCH.

Meanwhile, in NR V2X communication or NR sidelink communication, a transmitting UE may reserve/select one or more transmission resources for sidelink transmission (e.g., initial transmission and/or retransmission), and the transmitting UE may transmit information on the location of the one or more transmission resources to receiving UE(s).

Meanwhile, when performing sidelink communication, a method for a transmitting UE to reserve or pre-determine transmission resource(s) for receiving UE(s) may be representatively as follows.

For example, the transmitting UE may perform a reservation of transmission resource(s) based on a chain. Specifically, for example, if the transmitting UE reserves K transmission resources, the transmitting UE may transmit location information for less than K transmission resources to receiving UE(s) through a SCI transmitted to the receiving UE(s) at any (or specific) transmission time or a time resource. That is, for example, the SCI may include location information for less than the K transmission resources. Alternatively, for example, if the transmitting UE reserves K transmission resources related to a specific TB, the transmitting UE may transmit location information for less than K transmission resources to receiving UE(s) through a SCI transmitted to the receiving UE(s) at any (or specific) transmission time or a time resource. That is, the SCI may include location information for less than the K transmission resources. In this case, for example, it is possible to prevent performance degradation due to an excessive increase in payloads of the SCI, by signaling only the location information for less than K transmission resources to the receiving UE(s) through one SCI transmitted at any (or specific) transmission time or the time resource by the transmitting UE.

FIG. 10 shows a method in which a UE that has reserved transmission resource(s) informs another UE of the transmission resource(s), based on an embodiment of the present disclosure. The embodiment of FIG. 10 may be combined with various embodiments of the present disclosure.

Specifically, for example, (a) of FIG. 10 shows a method for performing by a transmitting UE chain-based resource reservation by transmitting/signaling location information of (maximum) 2 transmission resources to receiving UE(s) through one SCI, in the case of a value of K=4. For example, (b) of FIG. 10 shows a method for performing by a transmitting UE chain-based resource reservation by transmitting/signaling location information of (maximum) 3 transmission resources to receiving UE(s) through one SCI, in the case of a value of K=4. For example, referring to (a) and (b) of FIG. 10, the transmitting UE may transmit/signal only location information of the fourth transmission-related resource to the receiving UE(s) through the fourth (or last) transmission-related PSCCH. For example, referring to (a) of FIG. 10, the transmitting UE may transmit/signal to the receiving UE(s) not only location information of the fourth transmission-related resource but also location information of the third transmission-related resource additionally through the fourth (or last) transmission-related PSCCH. For example, referring to (b) of FIG. 10, the transmitting UE may transmit/signal to the receiving UE(s) not only location information of the fourth transmission-related resource but also location information of the second transmission-related resource and location information of the third transmission-related resource additionally through the fourth (or last) transmission-related PSCCH. In this case, for example, in (a) and (b) of FIG. 10, if the transmitting UE may transmit/signal to the receiving UE(s) only location information of the fourth transmission-related resource through the fourth (or last) transmission-related PSCCH, the transmitting UE may set or designate a field/bit of location information of unused or remaining transmission resource(s) to a pre-configured value (e.g., 0). For example, in (a) and (b) of FIG. 10, if the transmitting UE may transmit/signal to the receiving UE(s) only location information of the fourth transmission-related resource through the fourth (or last) transmission-related PSCCH, the transmitting UE may be set or designate a field/bit of location information of unused or remaining transmission resource(s) to a pre-configured status/bit value indicating/representing the last transmission (among 4 transmissions).

Meanwhile, for example, the transmitting UE may perform a reservation of transmission resource(s) based on a block. Specifically, for example, if the transmitting UE reserves K transmission resources, the transmitting UE may transmit location information for K transmission resources to receiving UE(s) through a SCI transmitted to the receiving UE(s) at any (or specific) transmission time or a time resource. That is, the SCI may include location information for K transmission resources. For example, if the transmitting UE reserves K transmission resources related to a specific TB, the transmitting UE may transmit location information for K transmission resources to receiving UE(s) through a SCI transmitted to the receiving UE(s) at any (or specific) transmission time or a time resource. That is, the SCI may include location information for K transmission resources. For example, (c) of FIG. 10 shows a method for performing by the transmitting UE block-based resource reservation, by signaling location information of 4 transmission resources to receiving UE(s) through one SCI, in the case of a value of K=4.

Meanwhile, in the next-generation communication system, the base station may transmit information related to sidelink transmission to the UE through Uu link or interface. In this case, the UE may operate in an NR sidelink resource allocation mode 1. When the UE operates in the NR sidelink resource allocation mode 1, the base station may transmit information related to NR sidelink transmission to the UE in the form of downlink control information (DCI) through a physical downlink control channel (PDCCH).

The PDCCH may carry downlink control information, and a quadrature phase shift keying (QPSK) modulation scheme may be applied. One PDCCH may include 1, 2, 4, 8, or 16 control channel elements (CCEs) according to an aggregation level (AL). One CCE may include 6 resource element groups (REGs). One REG may be defined as one OFDM symbol and one resource block (RB) or physical resource block (PRB). The PDCCH may be transmitted through a control resource set (hereinafter, CORESET). The CORESET may be defined as an REG set having a given numerology (e.g., subcarrier spacing, cyclic prefix length, etc.). For example, a plurality of CORESETs for one UE may overlap in a time/frequency domain. The CORESET may be configured through system information (e.g., master information block (MIB)) or UE-specific higher layer (e.g., radio resource control (RRC)layer) signaling. Specifically, for example, the number of RBs and the number of symbols (maximum 3) included in the CORESET may be configured by higher layer signaling. The number of CORESETs that can be allocated to the UE may be limited by considering complexity. For example, up to 3 CORESETs may be configured for the UE.

The UE may obtain DCI transmitted through a PDCCH by performing decoding (e.g., blind decoding) on a set of PDCCH candidates received through Uu link or interface. The set of PDCCH candidates decoded by the UE may be defined as a PDCCH search space set. The search space set may be a common search space or a UE-specific search space. The UE may obtain DCI by monitoring PDCCH candidates in one or more search space sets configured by MIB or higher layer signaling. Each CORESET configuration may be associated with one or more search space sets, and each search space set may be associated with one CORESET configuration. For example, one search space set may be determined based on the following parameters.

- controlResourceSetId: control resource set associated with search space set
- monitoringSlotPeriodicityAndOffset: PDCCH monitoring period duration (slot unit) and PDCCH monitoring duration offset (slot unit)
- monitoringSymbolsWithinSlot: PDCCH monitoring pattern in slot for PDCCH monitoring (e.g., first symbol(s) of control resource set)

nrofCandidates: The number of PDCCH candidates per AL={1, 2, 4, 8, 16} (one value selected from 0, 1, 2, 3, 4, 5, 6, 8)

Table 5 below exemplifies a feature per search space type.

TABLE 5

| Type | Search Space | RNTI (Radio Network Temporary Identifier) | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 6 below exemplifies DCI formats transmitted through a PDCCH.

TABLE 6

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

Referring to Table 6, DCI format 0_0 may be used to schedule a transport (113)-based (or TB-level) PUSCH, and DCI format 0_1 may be used to schedule a TB-based (or TB-level) PUSCH or Code Block Group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or CBG-based (or CBG-level) PDSCH. DCI format 2_0 may be used to transfer dynamic slot format information (e.g., dynamic slot format indicator (SF1)) to the UE, and DCI format 2_1 may be used to transfer downlink pre-emption information to the UE. DCI format 2_0 and/or DCI format 2_1 may be transferred to UEs in a corresponding group through a group common PDCCH which is a PDCCH transferred to UEs defined as one group. For example, the UE may attempt detection of DCI format 1_0 and DCI format 0_0 by monitoring PDCCH candidates in a Type0-PDCCH/Type0A-PDCCH/Type1-PDCCH/Type2-PDCCH common search space. In addition, for example, the UE may attempt detection of DCI format 2_0 and/or DCI format 2_1 and/or DCI format 2_2 and/or DCI format 2_3 and/or DCI format 1_0/0_0 by monitoring PDCCH candidates according to a configuration of the base station in a Type3-PDCCH common search space. Meanwhile, the UE may attempt detection of DCI format 1_0/0_0 or DCI format 1_1/0_1 by monitoring PDCCH candidates in a UE-specific search space.

A size of DCI format transmitted through Uu link or interface may be given or determined according to the following criterion. A size of DCI format 1_0/0_0 detected in the common search space may be determined based on a size of a CORESET 0 in case of a cell in which the CORESET 0 is configured, and may be determined based on an initial downlink (DL) BWP in case of a cell in which the CORESET 0 is not configured. A size of DCI format 1_1/0_1 may be determined based on an active DL BWP or an active UL BWP. A size of DCI format 2_0/2_1 may be configured or determined through higher layer signaling. A size of DCI format 2_2/2_3 may be determined to be equal to the size of DCI format 1_0/0_0 detected in the common search space. If a DCI format size budget is satisfied, the size of DCI format 1_0/0_0 detected in the UE-specific search space may be determined based on an active DL BWP or an active UL BWP, or may be determined based on the size of the CORESET 0 or the initial DL BWP. The DCI format size budget is defined to decrease UE implementation complexity. For example, it is assumed that a DCI format size corresponding to a cell-radio network temporary identifier (C-RNTI) is less than or equal to 3 for a specific cell, and a DCI format size is less than or equal to 4 without distinction of RNTI. In addition, for example, the size of DCI format 1_0/0_0 detected in the UE-specific search space may be changed to achieve the DCI format size budget.

The UE may attempt detection of PDCCH candidates in all common search spaces. Otherwise, regarding UE-specific search spaces, whether the PDCCH candidates will be detected in unit of search spaces may be determined to satisfy the limitation of the maximum number of blind decoding attempts and/or the number of CCEs for channel estimation by considering UE complexity. That is, for example, the number of UE-specific search spaces for attempting detection of the PDCCH candidates may be determined within a range not exceeding the limitation. For example, the UE may not attempt PDCCH blind decoding from a UE-specific search space having a highest search space ID.

Meanwhile, based on an embodiment of the present disclosure, a DCI size budget reference value related to DCI format 3_0 and/or DCI format 3_1 may be configured. For example, the DCI size budget reference value may be a reference value for a DCI size budget. Based on an embodiment of the present disclosure, a method of configuring a DCI size budget reference value may be referred to as proposed method 1. For example, based on an embodiment of the present disclosure, a DCI size budget reference value related to DCI format 3_0 may be configured for the UE. For example, based on an embodiment of the present disclosure, a DCI size budget reference value related to DCI format 3_1 may be configured for the UE. Herein, for example, DCI format 3_0 may be a DCI format used when NR SL scheduling is performed in mode 1. For example, DCI format 3_0 may be a DCI format used when NR SL scheduling is performed from a base station (e.g., NR gNB) in mode 1. For example, DCI format 3_1 may be a DCI format used when a base station (e.g., NR gNB) performs LTE SL scheduling. Also, for example, in the present disclosure, "SL communication" may include NR SL communication or LTE SL communication.

For example, a Uu DCI format related to a cell used as a DCI size budget reference value of DCI format 3_0 may be used as a reference for size fitting of DCI format 3_0. For example, a Uu DCI format related to a carrier used as a DCI size budget reference value of DCI format 3_0 may be used as a reference for size fitting of DCI format 3_0.

For example, a Uu DCI format related to a cell used as a DCI size budget reference value of DCI format 3_1 may be used as a reference for size fitting of DCI format 3_1. For example, a Uu DCI format related to a carrier used as a DCI size budget reference value of DC format 3_1 may be used as a reference for size fitting of DCI format 3_1.

For example, whether or not embodiments of the present disclosure are applied may be configured differently according to at least one of a mode 1 CG, a mode 1 DG, a service type, a priority, a QOS requirement (e.g., latency, reliability), a cast type (e.g., unicast, groupcast, broadcast), a HARQ feedback option (e.g., a method for feeding back only NACK (hereinafter referred to as NACK-ONLY feedback), a method for feeding back ACK/NACK (hereinafter referred to as ACK/NACK feedback), NACK-ONLY feedback based on a distance between a transmitting UE and a receiving UE), whether or not SL communication is performed on an NR carrier, whether or not SL communication is performed on an NR cell, whether or not SL communication is performed on an LTE carrier, whether or not SL communication is performed on an LTE cell, or whether or not SL communication is performed on an intelligent transport system (ITS) dedicated carrier.

For example, parameters related to embodiments of the present disclosure may be configured differently according to at least one of a mode 1 CG, a mode 1 DG, a service type, a priority, a QoS requirement (e.g., latency, reliability), a cast type (e.g., unicast, groupcast, broadcast), a HARQ feedback option (e.g., NACK-ONLY feedback, ACK/NACK feedback, NACK-ONLY feedback based on a distance between a transmitting UE and a receiving UE), whether or not SL communication is performed on an NR carrier, whether or not SL communication is performed on an NR cell, whether or not SL communication is performed on an LTE carrier, whether or not SL communication is performed on an LTE cell, or whether or not SL communication is performed on an ITS dedicated carrier.

Based on an embodiment of the present disclosure, if SL communication scheduled by DCI format 3_0 and/or DCI format 3_1 is performed on a cell and/or a carrier (hereinafter referred to as NRUU_CELL) in which NR Uu communication is performed, a DCI size budget related to the NR Uu cell may be considered as a DCI size budget reference value. In addition, for example, if SL communication scheduled by DCI format 3_0 and/or DCI format 3_1 is performed on an ITS dedicated carrier and/or an LTE licensed carrier, a DCI size budget related to a cell in which DCI format 3_0 and/or DCI format 3_1 is received may be considered as a DCI size budget reference value. For example, if SL communication scheduled by DCI format 3_0 and/or DCI format 31 is performed on an ITS dedicated carrier and/or an LTE licensed carrier, a DCI size budget related to a cell in which DCI format 3_0 and/or DCI format 3_1 is received may be considered as having no DCI size budget reference value. The embodiment of the present disclosure described above may be referred to as rule 1-1.

For example, if the UE performs SL communication scheduled by DCI format 3_0 on NRUU_CELL, the UE may determine a DCI size budget related to the NR Uu cell as a DCI size budget reference value. For example, if SL communication scheduled by DCI format 3_1 is performed on NRUU_CELL, a DCI size budget related to the NR Uu cell may be considered as a DCI size budget reference value. For example, if the UE performs SL communication scheduled by DCI format 3_1 on NRUU_CELL, the UE may determine a DCI size budget related to the NR Uu cell as a DCI size budget reference value.

For example, if SL communication scheduled by DCI format 3_0 is performed on an ITS-dedicated carrier (hereinafter referred to as ITS_FREQ), a DCI size budget related to a cell in which DCI format 3_0 is received may be considered as a DCI size budget reference value. Herein, for example, NR Uu communication and/or LTE Uu communication may not be performed in the ITS-dedicated carrier. Herein, for example, a cell in which DCI format 3_0 is received may be a scheduling cell in which NR Uu communication is performed. For example, if SL communication scheduled by DCI format 3_0 is performed on an LTE licensed cell and/or carrier (hereinafter referred to as LTE_FREQ) in which LTE Uu communication is performed, a DCI size budget related to a cell in which DCI format 3_0 is received may be considered as a DCI size budget reference value. For example, if the UE performs SL communication scheduled by DCI format 3_0 on an ITS-dedicated carrier, the UE may determine a DCI size budget related to a cell in which DCI format 3_0 is received as a DCI size budget reference value. For example, if the UE performs SL communication scheduled by DCI format 3_0 on LTE_FREQ, the UE may consider a DCI size budget related to a cell in which DCI format 3_0 is received as a DCI size budget reference value.

For example, if SL communication scheduled by DCI format 3_0 is performed on ITS_FREQ, a DCI size budget related to a cell in which DCI format 3_0 is received may be regarded as having no DCI size budget reference value. Herein, for example, NR Uu communication and/or LTE Uu communication may not be performed in the ITS-dedicated carrier. Herein, for example, a cell in which DCI format 3_0 is received may be a scheduling cell in which NR Uu communication is performed. For example, if SL communication scheduled by DCI format 3_0 is performed on LTE_FREQ in which LTE Uu communication is performed, a DCI size budget related to a cell in which DCI format 3_0 is received may be considered as having no DCI size budget reference value. For example, if the UE performs SL communication scheduled by DCI format 3_0 on ITS_FREQ, the UE may determine a DCI size budget related to a cell in which DCI format 3_0 is received as having no DCI size budget reference value. For example, if the UE performs SL communication scheduled in DCI format 3_0 on LTE_FREQ, the UE may consider a DCI size budget related to a cell in which DCI format 3_0 is received as having no DCI size budget reference value.

For example, if SL communication scheduled by DCI format 3_1 is performed on ITS_FREQ, a DCI size budget related to a cell in which DCI format 3_1 is received may be considered as a DCI size budget reference value. Herein, for example, NR Uu communication and/or LTE Uu communication may not be performed in the ITS-dedicated carrier. Herein, for example, a cell in which DCI format 3_1 is received may be a scheduling cell in which NR Uu communication is performed. For example, if SL communication scheduled by DCI format 3_1 is performed on LTE_FREQ in which LTE Uu communication is performed, a DCI size budget related to a cell in which DCI format 3_1 is received may be considered as a DCI size budget reference value. For example, if the UE performs SL communication scheduled by DCI format 3_1 on ITS_FREQ, the UE may determine a DCI size budget related to a cell in which DCI format 3_1 is received as a DCI size budget reference value. For example, if the UE performs SL communication scheduled by DCI format 3_1 on LTE_FREQ, the UE may consider a DCI size budget related to a cell in which DCI format 3_1 is received as a DCI size budget reference value.

For example, if SL communication scheduled by DCI format 3_1 is performed on ITS_FREQ, a DCI size budget related to a cell in which DCI format 3_1 is received may be considered as having no DCI size budget reference value. Herein, for example, NR Uu communication and/or LTE Uu communication may not be performed in the ITS-dedicated carrier. Herein, for example, a cell in which DCI format 3_1 is received may be a scheduling cell in which NR Uu communication is performed. For example, if SL communication scheduled by DCI format 3_1 is performed on LTE_FREQ in which LTE Uu communication is performed, a DCI size budget related to a cell in which DCI format 3_1 is received may be considered as having no DCI size budget reference value. For example, if the UE performs SL communication scheduled by DCI format 3_1 on ITS_FREQ, the UE may determine a DCI size budget related to a cell in which DCI format 3_1 is received as having no DCI size budget reference value. For example, if the UE performs SL communication scheduled by DCI format 3_1 on LTE_FREQ, the UE may consider a DCI size budget related to a cell in which DCI format 3_1 is received as having no DCI size budget reference value.

Based on an embodiment of the present disclosure, DCI size budget reference values may be configured differently between DCI format 3_0 and DCI format 3_1. For example, in the case of DCI format 3_0, the above-described rule 1-1 may be applied, and in the case of DCI format 3_1, a DCI size budget related to a cell in which DCI format 3_1 is received may always be considered as a DCI size budget value. For example, in the case of DCI format 3_0, the above-described rule 1-1 may be applied, and in the case of DCI format 3_1, a DCI size budget related to a cell in which DCI format 3_1 is received may always be considered as having no DCI size budget value. Herein, for example, a cell in which DCI format 3_1 is received may be a scheduling cell in which NR Uu communication is performed.

For example, in the case of DCI format 3_1, the above-described rule 1-1 may be applied, and in the case of DCI format 3_0, a DCI size budget related to a cell in which DCI format 3_0 is received may always be considered as a DCI size budget value. For example, in the case of DCI format 3_1, the above-described rule 1-1 may be applied, and in the case of DCI format 3_0, a DCI size budget related to a cell in which DCI format 3_0 is received may always be considered as having no DCI size budget value. Herein, for example, a cell in which DCI format 3_0 is received may be a scheduling cell in which NR Uu communication is performed.

For example, in the case of DCI format 3_1, the above-described rule 1-1 may be applied, and in the case of DCI format 3_0, a DCI size budget related to a cell in which DCI format 3_1 is received may always be considered as a DCI size budget value. For example, in the case of DCI format 3_1, the above-described rule 1-1 may be applied, and in the case of DCI format 3_0, a DCI size budget related to a cell in which DCI format 3_1 is received may always be considered as having no DCI size budget value. Herein, for example, a cell in which DCI format 3_1 is received may be a scheduling cell in which NR Uu communication is performed.

Based on an embodiment of the present disclosure, a search space (hereinafter referred to as SS) in which DCI format 3_0 and/or DCI format 3_1 is detected may be determined. For example, if the proposed method 1 is applied, the UE may determine an SS hashing function in which DCI format 3_0 is detected. For example, if the proposed method 1 is applied, the UE may determine an SS hashing function in which DCI format 3_1 is detected. Herein, for example, an SS may include an SS hashing function. Also, for example, in the present disclosure, SL communication may include NR SL communication or LTE SL communication. For example, whether or not embodiments of the present disclosure are applied may be configured differently according to at least one of a mode 1 CG, a mode 1 DG, a service type, a priority, a QoS requirement (e.g., latency, reliability), a cast type (e.g., unicast, groupcast, broadcast), a HARQ feedback option (e.g., NACK-ONLY feedback, ACK/NACK feedback, NACK-ONLY feedback based on a distance between a transmitting UE and a receiving UE), whether or not SL communication is performed on an NR carrier, whether or not SL communication is performed on an NR cell, whether or not SL communication is performed on an LTE carrier, whether or not SL communication is performed on an LTE cell, or whether or not SL communication is performed on an ITS dedicated carrier. For example, parameters related to embodiments of the present disclosure may be configured differently according to at least one of a mode 1 CG, a mode 1 DG, a service type, a priority, a QoS requirement (e.g., latency, reliability), a cast type (e.g., unicast, groupcast, broadcast), a HARQ feedback option (e.g., NACK-ONLY feedback, ACK/NACK feedback, NACK-ONLY feedback based on a distance between a transmitting UE and a receiving UE), whether or not SL communication is performed on an NR carrier, whether or not SL communication is performed on an NR cell, whether or not SL communication is performed on an LTE carrier, whether or not SL communication is performed on an LTE cell, or whether or not SL communication is performed on an ITS dedicated carrier.

For example, an SS related to DCI format 3_0 and/or DCI format 3_1 may be determined based on a carrier indication field (CIF) value related to a cell in which DCI format 3_0 and/or DCI format 3_1 is received. For example, the SS may include an SS hashing function. For example, a method for determining the SS in this way may be referred to as option 2-1. For example, the UE may determine the SS related to DCI format 3_0 based on a CIF value related to a Uu communication scheduling cell and/or carrier in which DCI format 3_0 is received. For example, the UE may determine the SS related to DCI format 3_1 based on a CIF value related to a Uu communication scheduling cell and/or carrier in which DCI format 3_1 is received.

For example, an SS related to DCI format 3_0 and/or DCI format 3_1 may be determined based on a CIF value related to a cell in which SL communication is performed. For example, the SS may include an SS hashing function. For example, a method for determining the SS in this way may be referred to as option 2-2. For example, the UE may determine the SS related to DCI format 3_0 based on a CIF value related to a Uu communication scheduled cell and/or carrier in which SL communication is performed. For example, the UE may determine the SS related to DCI format 3_1 based on a CF value related to a Uu communication scheduled cell and/or carrier in which SL communication is performed. Herein, the scheduled cell may be a cell in which Uu communication is scheduled.

For example, an SS related to DCI format 3_0 and/or DCI format 3_1 may be determined based on the same parameter/type as an SS related to a cell in which DCI format 3_0 and/or DCI format 3_1 is received. For example, the SS may include an SS hashing function. For example, a method for determining the SS in this way may be referred to as option 2-3. For example, the UE may determine the SS related to DCI format 3_0 based on the same parameter/type as an SS of a pre-configured Uu DCI format related to a Uu communication scheduling cell and/or carrier. For example, the UE may determine the SS related to DCI format 3_0 based on the same parameter/type as an SS of a pre-configured Uu DCI format related to a Uu communication scheduled cell and/or carrier. For example, the UE may determine the SS related to DCI format 3_1 based on the same parameter/type as an SS of a pre-configured Uu DCI format related to a Uu communication scheduling cell and/or carrier. For example, the UE may determine the SS related to DCI format 3_1 based on the same parameter/type as an SS of a pre-configured Uu DCI format related to a Uu communication scheduled cell and/or carrier.

For example, an SS related to DCI format 3_0 and/or DCI format 3_1 may be determined based on a pre-configured CIF value. For example, the SS may include an SS hashing function. For example, a method for determining the SS in this way may be referred to as option 2-4. Herein, for example, the pre-configured CIF value may be a value other than '0' used for a primary cell (hereinafter referred to as Pcell). Additionally, for example, the pre-configured CIF value may be '0'. For example, the option 2-4 described above may be applied when SL communication is performed on an NR licensed carrier. For example, the pre-configured CIF value may be a value other than CIF values related to a Uu communication scheduling cell and/or carrier in which DCI format 3_0 and/or DCI format 3_1 is received. For example, the SS related to DCI format 3_0 and/or DCI format 3_1 may be determined based on a CIF value related to a specific cell and/or carrier. For example, the SS related to DCI format 3_0 and/or DCI format 3_1 may be determined based on an SS related parameter/type of a pre-configured Uu DCI format. For example, the UE first establishes an RRC connection through a PCell and additionally establishes an RRC connection with a secondary cell (SCell). For example, the UE may perform communication through the PCell and the SCell, and may receive data through the two cells. For example, the UE may transmit data through the PCell, and the UE may obtain system information and perform handover control through the PCell. For example, the PCell may be a cell that transmits DCI to the UE.

For example, the UE may determine the SS related to DCI format 3_0 based on the pre-configured CIF value. For example, the pre-configured CIF value may be a value other than '0' used in the PCell. Additionally, for example, the pre-configured CIF value may be 0. For example, the pre-configured CIF value may be a value other than CIF values related to the Uu communication scheduling cell and/or carrier in which DCI format 3_0 is received. For example, the UE may determine the SS related to DCI format 3_0 based on the CIF value related to the specific cell and/or carrier. For example, the UE may determine the SS related to DCI format 3_0 based on the SS related parameter/type of the pre-configured Uu DCI format.

For example, the UE may determine the SS related to DCI format 3_1 based on the pre-configured CIF value. For example, the pre-configured CIF value may be a value other than '0' used in the PCell. Additionally, for example, the pre-configured CIF value may be 0. For example, the pre-configured CIF value may be a value other than CIF values related to the Uu communication scheduling cell and/or carrier in which DCI format 3_1 is received. For example, the UE may determine the SS related to DCI format 3_1 based on the CIF value related to the specific cell and/or carrier. For example, the UE may determine the SS related to DCI format 3_1 based on the SS related parameter/type of the pre-configured Uu DCI format.

In addition, for example, different options may be applied depending on whether SL communication is performed on ITS_FREQ. For example, different options may be applied depending on whether SL communication is performed on LTE_FREQ. For example, different options may be applied depending on whether SL communication is performed on an NR Uu cell and/or carrier. Herein, for example, SL communication may be SL communication scheduled through DCI format 3_0 and/or DCI format 3_1. For example, the option 2-4 may be applied when SL communication is performed on ITS_FREQ, and the option 2-1 may be applied when SL communication is performed on an NR Uu cell and/or carrier. Alternatively, for example, the option 2-1 may be applied when SL communication is performed on ITS_FREQ, and the option 2-4 may be applied when SL communication is performed on an NR Uu cell and/or carrier. For example, the option 2-4 may be applied when SL communication is performed on LTE_FREQ, and the option 2-1 may be applied when SL communication is performed on an NR Uu cell and/or carrier. Alternatively, for example, the option 2-1 may be applied when SL communication is performed on LTE_FREQ, and the option 2-4 may be applied when SL communication is performed on an NR Uu cell and/or carrier.

Figure 11:
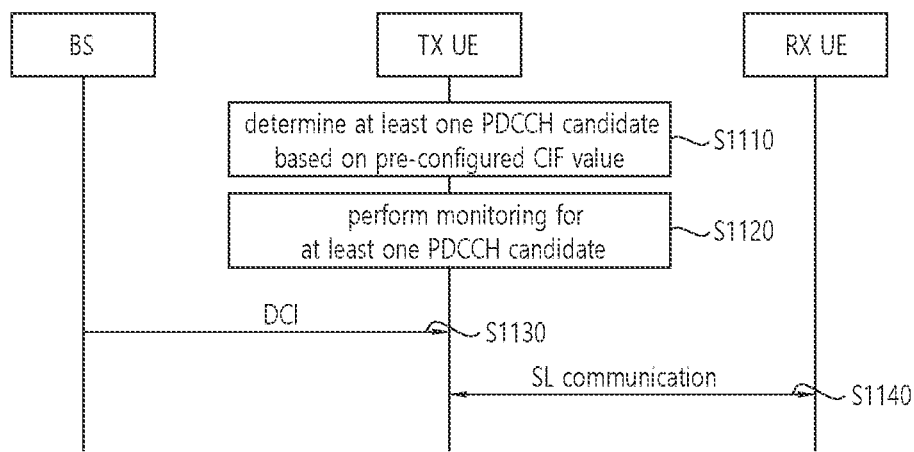
FIG. 11 shows a procedure for a transmitting UE to perform scheduled SL communication based on DCI, based on an embodiment of the present disclosure.

FIG. 11 shows a procedure for a transmitting UE to perform scheduled SL communication based on DCI, based on an embodiment of the present disclosure. The embodiment of FIG. 11 may be combined with various embodiments of the present disclosure. The embodiment of FIG. 11 may be combined with various embodiments of the present disclosure.

Referring to FIG. 11, in step S1110, the transmitting UE may determine at least one physical downlink control channel (PDCCH) candidate in a search space related to DCI based on a pre-configured carrier indication field (CIF) value. For example, the transmitting UE may determine the search space related to downlink control information (DCI) based on the pre-configured carrier indication field (CIF) value. For example, the search space may include at least one PDCCH candidate. For example, the DCI may be DCI related to SL communication. For example, a format of the DCI may be DCI format 3_0 or DCI format 3_1. For example, DCI format 3_0 may be a DCI format for scheduling of NR sidelink. For example, DCI format 3_1 may be a DCI format for scheduling of LTE sidelink.

For example, based on that a CIF value related to the DCI is a first value and the pre-configured CIF value is a second value, the transmitting UE may determine at least one PDCCH candidate in the search space related to the DCI by using the second value. For example, the pre-configured CIF value may be '0'. For example, the pre-configured CF value may be used to determine an SS hashing function.

In step S1120, the transmitting UE may perform monitoring for at least one PDCCH candidate in the search space. In step S1130, the transmitting UE may receive DCI based on the monitoring. For example, a DCI size budget value may refer to a DCI size budget for a cell related to Uu communication. For example, the transmitting UE may perform size alignment related to the DCI based on the DCI size budget for the cell related to the Uu communication.

In step S1140, the transmitting UE may perform SL communication scheduled based on the DCI with the receiving UE. For example, the transmitting UE may perform SL communication with the receiving UE on an ITS dedicated carrier or an LTE licensed carrier. For example, the transmitting UE may perform SL communication with the receiving UE on an NR licensed carrier.

For example, the transmitting UE may differently determine the search space related to DCI according to a carrier in which SL communication is performed.

For example, based on that the transmitting UE performs SL communication scheduled based on DCI in a cell related to NR Uu communication, the DCI size budget value may be a value referring to a DCI size budget for the cell related to the NR Uu communication.

For example, based on that the transmitting UE performs SL communication scheduled based on DCI on an ITS-dedicated carrier or an LTE licensed carrier, the DCI size budget value may be a value referring to a DCI size budget for a cell in which the DCI is received.

For example, based on that the transmitting UE performs SL communication scheduled based on DCI on an ITS-dedicated carrier or an LTE licensed carrier, the transmitting UE may determine that there is no reference value for the DCI size budget.

For example, DCI size budgets between DCI format 3_0 and DCI format 3_1 may be configured differently. For example, a DCI size budget related to DCI format 3_0 may be a value referring to the DCI size budget for the cell related to the NR Uu communication. For example, a DCI size budget related to DCI format 3_1 may be a value referring to a DCI size budget related to a cell in which DCI related to DCI format 3_1 is received.

Figure 12:
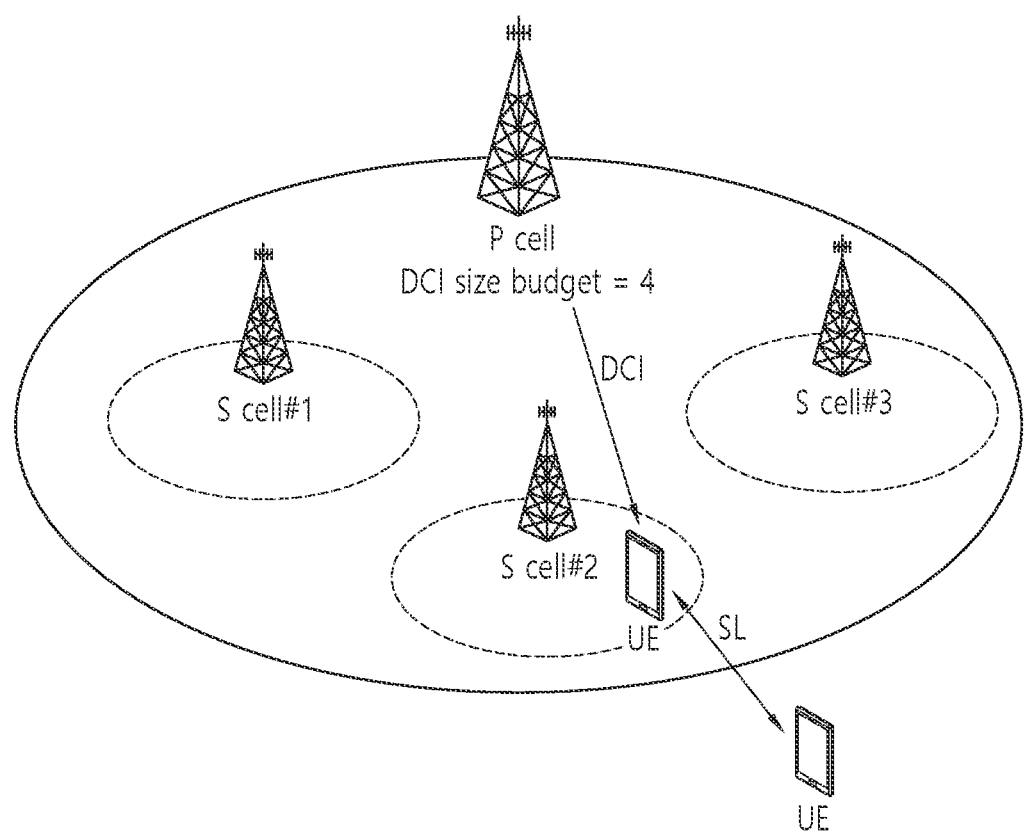
FIG. 12 shows an example of a DCI size budget when a UE performs SL communication in an S cell, based on an embodiment of the present disclosure.

FIG. 12 shows an example of a DCI size budget when a UE performs SL communication in an S cell, based on an embodiment of the present disclosure. The embodiment of FIG. 12 may be combined with various embodiments of the present disclosure.

Referring to FIG. 12, for example, cross-carrier scheduling may be performed in one P cell and three S cells. In this case, for example, if the UE receives DCI from the P cell and performs SL communication in the second S cell (S cell #2), it may be a problem to refer to a DCI size budget related to which cell for a DCI size budget of the UE. For example, if a DCI size budget value of the scheduling cell (P-cell) is 4, the UE may determine the DCI size budget value (e.g., 4) of the scheduling cell (P cell) as a reference value for a DCI size budget value related to SL communication. For example, instead of a DCI size budget value of a scheduled cell (S cell #2), the UE may use the DCI size budget value of the scheduling cell (P cell) as a reference value for a DCI size budget value related to SL communication. Through this, when cross-carrier scheduling is performed, the DCI size budget can be efficiently managed.

Figure 13:
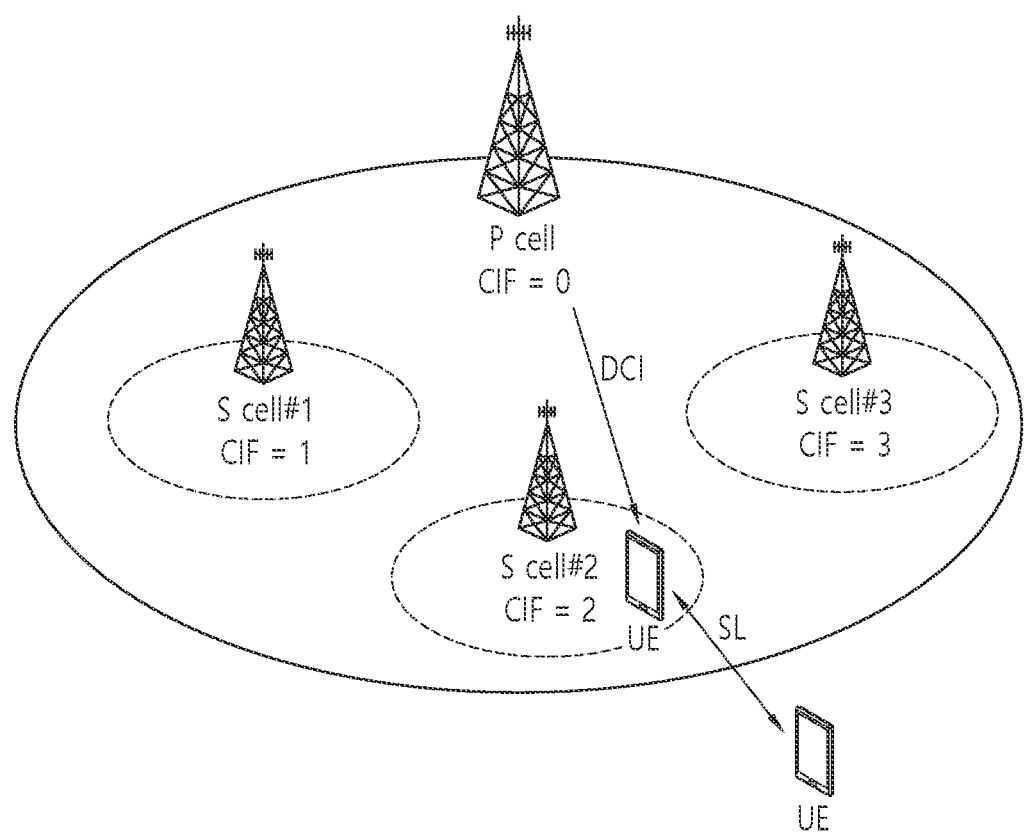
FIG. 13 shows an example of a CIF value when a UE performs SL communication in an S cell, based on an embodiment of the present disclosure.

FIG. 13 shows an example of a CIF value when a UE performs SL communication in an S cell, based on an embodiment of the present disclosure. The embodiment of FIG. 13 may be combined with various embodiments of the present disclosure.

Referring to FIG. 13, for example, cross-carrier scheduling may be performed in one P cell and three S cells. In this case, for example, if the UE receives DCI from the P cell and performs SL communication in the second S cell (S cell #2), it may be a problem which cell-related CIF value the UE uses as a CIF value for determining an SS. For example, if a CIF value of a scheduling cell (P cell) is 0, the UE may determine a CIF value for determining an SS as the CIF value (e.g., 0) of the scheduling cell (P cell). For example, instead of a CIF value (e.g., 2) of an S cell #2 performing SL communication, the UE may use the CIF value of the P cell as a CIF value for determining an SS. Alternatively, for example, the UE may use a pre-configured CIF value (e.g., 0) as a CIF value for determining an SS, rather than the CIF value of the S cell #2 performing SL communication.

Additionally, for example, an n_CI value of PDCCH candidates for an SL DCI format may be set to 0. For example, the number of PDCCH candidates related to the SL DCI format may be set to a candidate number value corresponding to a scheduling cell configured by the SL DCI format.

For example, the n_CI value may be a value of a carrier indication field if the carrier indication field is configured for the UE by configuration related to cross-carrier scheduling for a serving cell in which a PDCCH is monitored. For example, otherwise, the n_CI value may be '0' including all common search spaces (CSSs). That is, for example, if the carrier indication field is not configured for the UE by configuration related to cross-carrier scheduling for the serving cell in which the PDCCH is monitored, the value of the carrier indication field may be '0'.

For example, for the UE, if a cross-carrier-related parameter (e.g., CrossCarrierSchedulingConfig) is configured for a serving cell, a value of a carrier indication field may correspond to a value indicated by CrossCarrierSchedulingConfig. For example, in the case of an active DL BWP of a serving cell in which the UE monitors PDCCH candidates in an USS, if a carrier indication field is not configured for the UE, the UE may monitor PDCCH candidates without the carrier indication field. For example, in the case of an active DL BWP of a serving cell in which the UE monitors PDCCH candidates in an USS, if a carrier indication field is configured for the UE, the UE may monitor PDCCH candidates by using the carrier indication field.

For example, if the UE is configured to monitor PDCCH candidates by using a carrier indication field corresponding to a corresponding S cell of another serving cell, the UE may not expect to monitor PDCCH candidates in an active DL BWP of the S cell. For example, for an active DL BWP of a serving cell in which the UE monitors PDCCH candidates, the UE may monitor PDCCH candidates for at least the same serving cell.

For example, in the case of a search space set related to CORESET, CCE indexes may be determined based on a carrier indication field value, a slot for an active DL BWP of a serving cell corresponding to a carrier indication field value, the number of PDCCH candidates in a search space configured in the slot, and an aggregation level corresponding to the number of PDCCH candidates.

For example, DCI corresponding to DCI format 3_1 may include a carrier indication.

Figure 14:
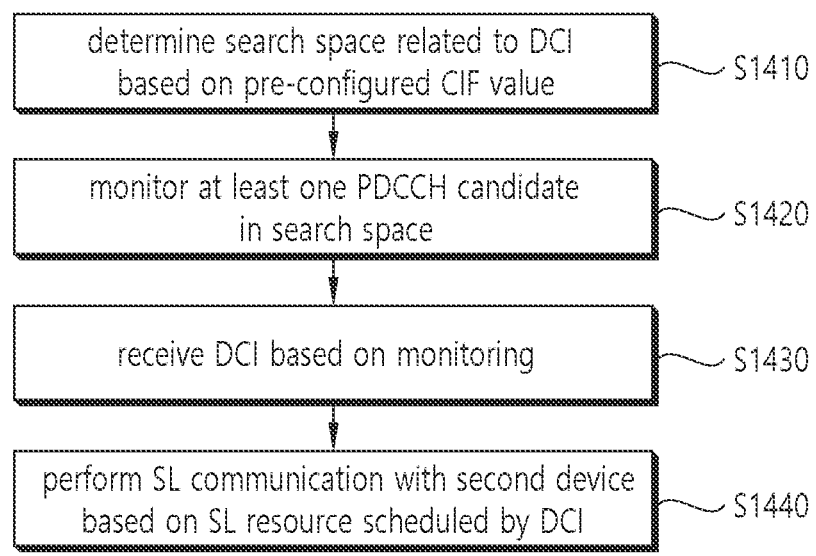
FIG. 14 shows a method for a first device to perform scheduled SL communication based on DCI, based on an embodiment of the present disclosure.

FIG. 14 shows a method for a first device to perform scheduled SL communication based on DCI, based on an embodiment of the present disclosure. The embodiment of FIG. 14 may be combined with various embodiments of the present disclosure.

Referring to FIG. 14, in step S1410, the first device 100 may determine a search space related to downlink control information (DCI) based on a pre-configured carrier indication field (CIF) value. For example, the DCI may be DCI related to SL communication. For example, a format of the DCI may be DCI format 3_0 or DCI format 3_1. For example, DCI format 3_0 may be a DCI format for scheduling of NR sidelink. For example, DCI format 3_1 may be a DCI format for scheduling of LTE sidelink.

For example, based on that a CIF value related to the DCI is a first value and the pre-configured CIF value is a second value, the first device 100 may determine at least one PDCCH candidate in the search space related to the DCI by using the second value. For example, the pre-configured CIF value may be '0'. For example, the pre-configured CIF value may be used to determine an SS hashing function.

In step S1420, the first device 100 may monitor at least one physical downlink control channel (PDCCH) candidate in the search space. In step S1430, the first device 100 may receive the DCI based on the monitoring. For example, a DCI size budget value may refer to a DCI size budget for a cell related to Uu communication. For example, the first device 100 may perform size alignment related to the DCI based on the DCI size budget for the cell related to the Uu communication.

In step S1440, the first device 100 may perform SL communication with the second device based on sidelink (SL) resource(s) scheduled by the DCI.

For example, the first device 100 may perform SL communication with the second device 200 on an ITS dedicated carrier or an LTE licensed carrier. For example, the first device 100 may perform SL communication with the second device 200 on an NR licensed carrier.

For example, the first device 100 may differently determine the search space related to the DCI according to a carrier in which SL communication is performed.

For example, based on that the first device 100 performs SL communication scheduled based on the DCI in a cell related to NR Uu communication, the DCI size budget value may be a value referring to the DC size budget for the cell related to the NR Uu communication.

For example, based on that the first device 100 performs SL communication scheduled based on the DCI on an ITS-dedicated carrier or an LTE licensed carrier, the DCI size budget value may be a value referring to a DCI size budget for a cell in which the DCI is received.

For example, based on that the first device 100 performs SL communication scheduled based on the DCI on an ITS-dedicated carrier or an LTE licensed carrier, the first device 100 may determine that there is no reference value for a size budget of the DCI.

For example, DCI size budgets between DCI format 3_0 and DCI format 3_1 may be configured differently. For example, a DCI size budget related to DCI format 3_0 may be a value referring to a DCI size budget for a cell related to the NR Uu communication. For example, a DCI size budget related to DCI format 3_1 may be a value referring to a DCI size budget related to a cell in which DCI related to DCI format 3_1 is received.

The above-described embodiments can be applied to various devices described below. For example, the processor 102 of the first device 100 may determine a search space related to downlink control information (DCI) based on a pre-configured carrier indication field (CIF) value. In addition, the processor 102 of the first device 100 may monitor at least one physical downlink control channel (PDCCH) candidate in the search space. In addition, the processor 102 of the first device 100 may control the transceiver 106 to receive the DCI based on the monitoring. In addition, the processor 102 of the first device 100 may control the transceiver 106 to perform SL communication with a second device based on a sidelink (SL) resource scheduled by the DCI.

Based on an embodiment of the present disclosure, a first device adapted to perform wireless communication may be provided. For example, the first device may comprise: one or more memories storing instructions; one or more transceivers; and one or more processors connected to the one or more memories and the one or more transceivers. For example, the one or more processors may execute the instructions to: determine a search space related to downlink control information (DCI) based on a pre-configured carrier indication field (CIF) value; monitor at least one physical downlink control channel (PDCCH) candidate in the search space; receive the DCI based on the monitoring; and perform SL communication with a second device based on a sidelink (SL) resource scheduled by the DCI.

Based on an embodiment of the present disclosure, an apparatus adapted to control a first user equipment (UE) may be provided. For example, the apparatus may comprise: one or more processors: and one or more memories operably connected to the one or more processors and storing instructions. For example, the one or more processors may execute the instructions to: determine a search space related to downlink control information (DCI) based on a pre-configured carrier indication field (CIF) value: monitor at least one physical downlink control channel (PDCCH) candidate in the search space; receive the DCI based on the monitoring; and perform SL communication with a second UE based on a sidelink (SL) resource scheduled by the DCI.

Based on an embodiment of the present disclosure, a non-transitory computer-readable storage medium storing instructions may be provided. For example, the instructions, when executed, may cause a first device to: determine a search space related to downlink control information (DCI) based on a pre-configured carrier indication field (CIF) value; monitor at least one physical downlink control channel (PDCCH) candidate in the search space; receive the DCI based on the monitoring; and perform SL communication with a second device based on a sidelink (SL) resource scheduled by the DCI.

FIG. 15 shows a method for a second device to perform scheduled SL communication based on DCI with a first device, based on an embodiment of the present disclosure. The embodiment of FIG. 15 may be combined with various embodiments of the present disclosure.

Referring to FIG. 15, in step S1510, the second device 200 may perform sidelink (SL) communication with the first device 100 based on SL resource(s) scheduled by downlink control information (DCI). For example, a search space related to the DCI may be determined based on a pre-configured carrier indication field (CIF) value. For example, monitoring for at least one physical downlink control channel (PDCCH) candidate may be performed in the search space. For example, the DCI may be received based on the monitoring.

For example, the DCI may be a DCI related to SL communication. For example, a format of the DCI may be DCI format 3_0 or DCI format 3_1. For example, DCI format 3_0 may be a DCI format for scheduling of NR sidelink. For example, DCI format 3_1 may be a DCI format for scheduling of LTE sidelink.

For example, based on that a CIF value related to the DCI is a first value and the pre-configured CIF value is a second value, at least one PDCCH candidate in the search space related to the DCI may be determined by using the second value. For example, the pre-configured CIF value may be '0'. For example, the pre-configured CIF value may be used to determine an SS hashing function.

For example, a DC size budget value may refer to a DCI size budget for a cell related to Uu communication. For example, size alignment related to the DCI may be performed based on the DCI size budget for the cell related to the Uu communication.

For example, the SL communication may be performed on an ITS dedicated carrier or an LTE licensed carrier. For example, the SL communication may be performed on an NR licensed carrier.

For example, the search space related to the DCI may be differently determined according to a carrier in which the SL communication is performed.

For example, based on that the SL communication scheduled based on the DCI is performed on a cell related to NR Uu communication, the DCI size budget value may be a value referring to a DCI size budget for a cell related to NR Uu communication.

For example, based on that the SL communication scheduled based on the DCI is performed on an ITS-dedicated carrier or an LTE licensed carrier, the DCI size budget value may be a value referring to a DCI size budget for a cell in which the DCI is received.

For example, based on that the SL communication scheduled based on the DCI is performed on an ITS-dedicated carrier or an LTE licensed carrier, it may be determined that there is no reference value for the size budget of the DCI.

For example, DCI size budgets between DCI format 3_0 and DCI format 3_1 may be configured differently. For example, a DCI size budget related to DCI format 3_0 may be a value referring to a DCI size budget for a cell related to the NR Uu communication. For example, a DCI size budget related to DCI format 3_1 may be a value referring to a DCI size budget related to a cell in which DCI related to DCI format 3_1 is received.

The above-described embodiments can be applied to various devices described below. For example, the processor 202 of the second device 200 may control the transceiver 206 to perform sidelink (SL) communication with the first device 100 based on SL resource(s) scheduled by downlink control information (DCI).

Based on an embodiment of the present disclosure, a second device adapted to perform wireless communication may be provided. For example, the second device may comprise: one or more memories storing instructions; one or more transceivers; and one or more processors connected to the one or more memories and the one or more transceivers. For example, the one or more processors may execute the instructions to: perform sidelink (SL) communication with a first device based on a SL resource scheduled by downlink control information (DCI). For example, a search space related to the DCI may be determined based on a pre-configured carrier indication field (CIF) value, and monitoring may be performed for at least one physical downlink control channel (PDCCH) candidate in the search space, and the DCI may be received based on the monitoring.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 16:
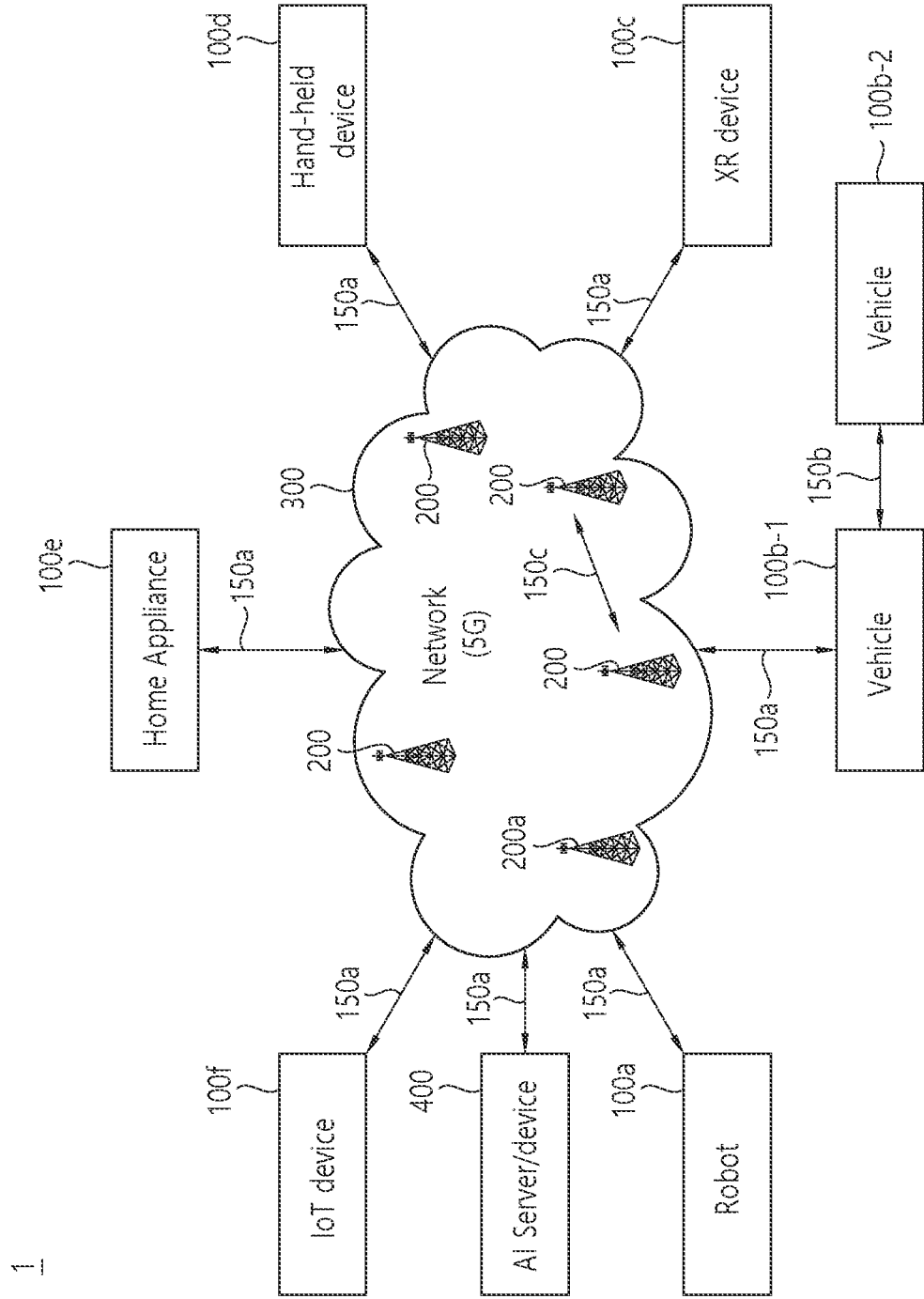
FIG. 16 shows a communication system 1, based on an embodiment of the present disclosure.

FIG. 16 shows a communication system 1, based on an embodiment of the present disclosure.

Referring to FIG. 16, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M. and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 17:
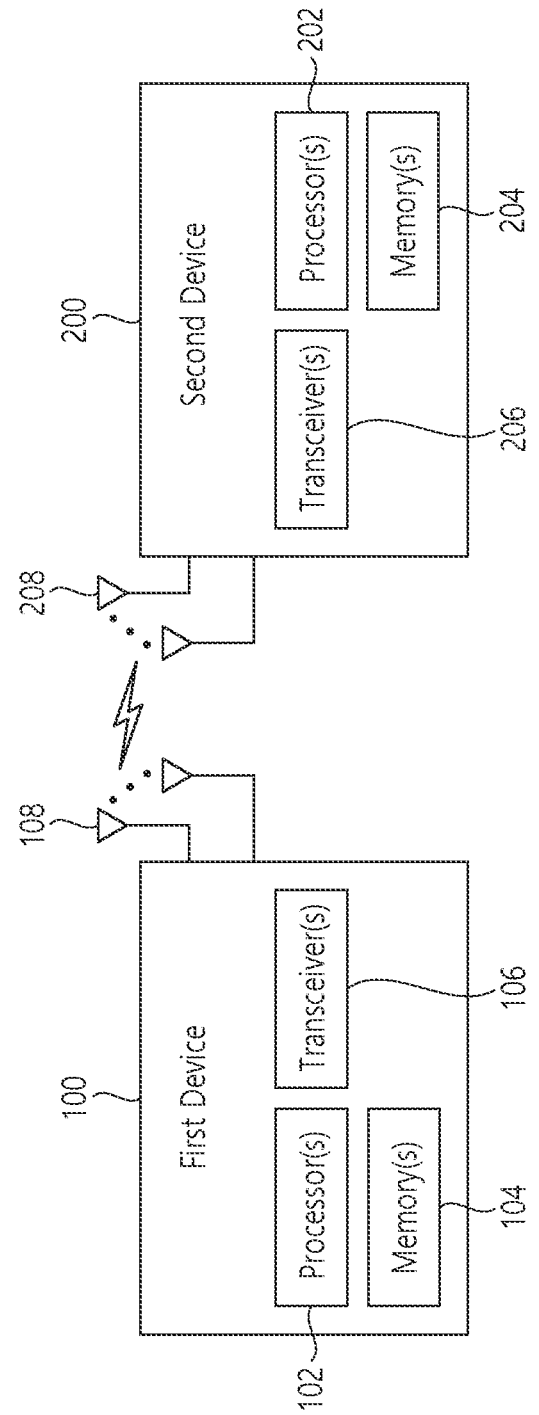
FIG. 17 shows wireless devices, based on an embodiment of the present disclosure.

FIG. 17 shows wireless devices, based on an embodiment of the present disclosure.

Referring to FIG. 17, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 16.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs). Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 18:
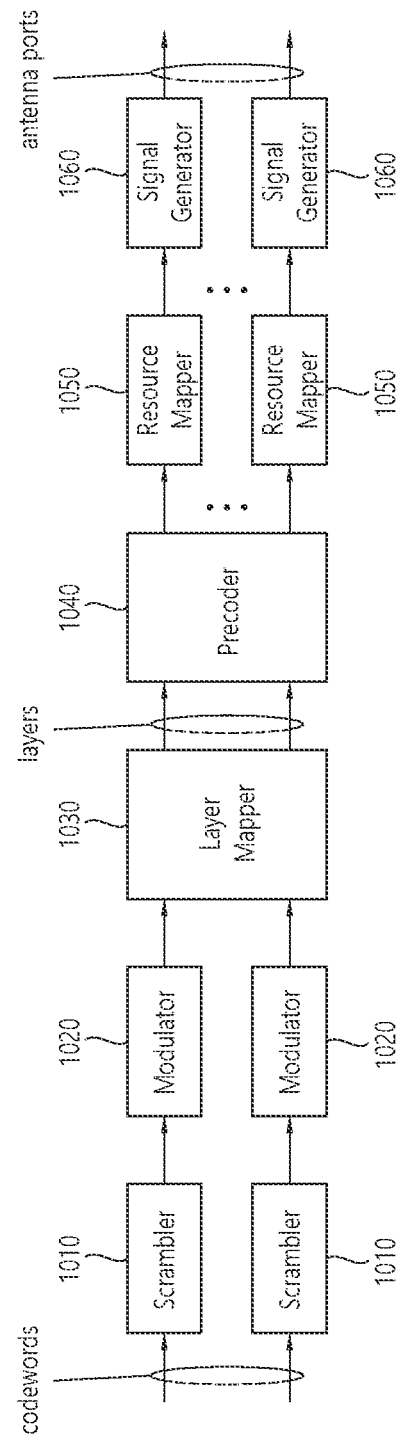
FIG. 18 shows a signal process circuit for a transmission signal, based on an embodiment of the present disclosure.

FIG. 18 shows a signal process circuit for a transmission signal, based on an embodiment of the present disclosure.

Referring to FIG. 18, a signal processing circuit 1000 may include scramblers 1010, modulators 1020, a layer mapper 1030, a precoder 1040, resource mappers 1050, and signal generators 1060. An operation/function of FIG. 18 may be performed, without being limited to, the processors 102 and 202 and/or the transceivers 106 and 206 of FIG. 17. Hardware elements of FIG. 18 may be implemented by the processors 102 and 202 and/or the transceivers 106 and 206 of FIG. 17. For example, blocks 1010 to 1060 may be implemented by the processors 102 and 202 of FIG. 17. Alternatively, the blocks 1010 to 1050 may be implemented by the processors 102 and 202 of FIG. 17 and the block 1060 may be implemented by the transceivers 106 and 206 of FIG. 17.

Codewords may be converted into radio signals via the signal processing circuit 1000 of FIG. 18. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 18. For example, the wireless devices (e.g., 100 and 200 of FIG. 17) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 19:
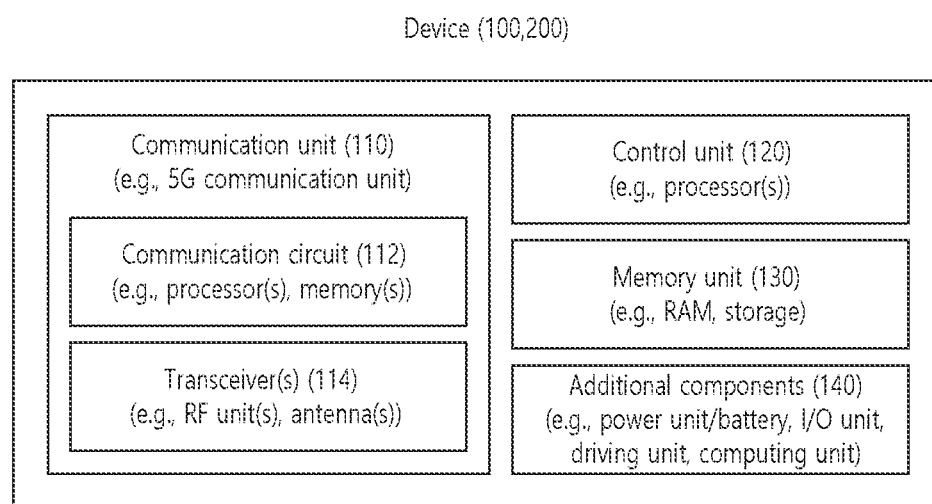
FIG. 19 shows another example of a wireless device, based on an embodiment of the present disclosure.

FIG. 19 shows another example of a wireless device, based on an embodiment of the present disclosure. The wireless device may be implemented in various forms according to a use-case/service (refer to FIG. 16).

Referring to FIG. 19, wireless devices 100 and 200 may correspond to the wireless devices 100 and 200 of FIG. 17 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 17. For example, the transceiver(s) 114 may include the one or more transceivers 106 and 206 and/or the one or more antennas 108 and 208 of FIG. 17. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 16), the vehicles (100b-1 and 100b-2 of FIG. 16), the XR device (100c of FIG. 16), the hand-held device (100d of FIG. 16), the home appliance (100e of FIG. 16), the IoT device (100f of FIG. 16), a digital broadcast terminal, a hologram device, a public safety device, an MTC device, a medicine device, a fintech device (or a finance device), a security device, a climate/environment device, the AI server/device (400 of FIG. 16), the BSs (200 of FIG. 16), a network node, etc. The wireless device may be used in a mobile or fixed place according to a use-example/service.

In FIG. 19, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 19 will be described in detail with reference to the drawings.

Figure 20:
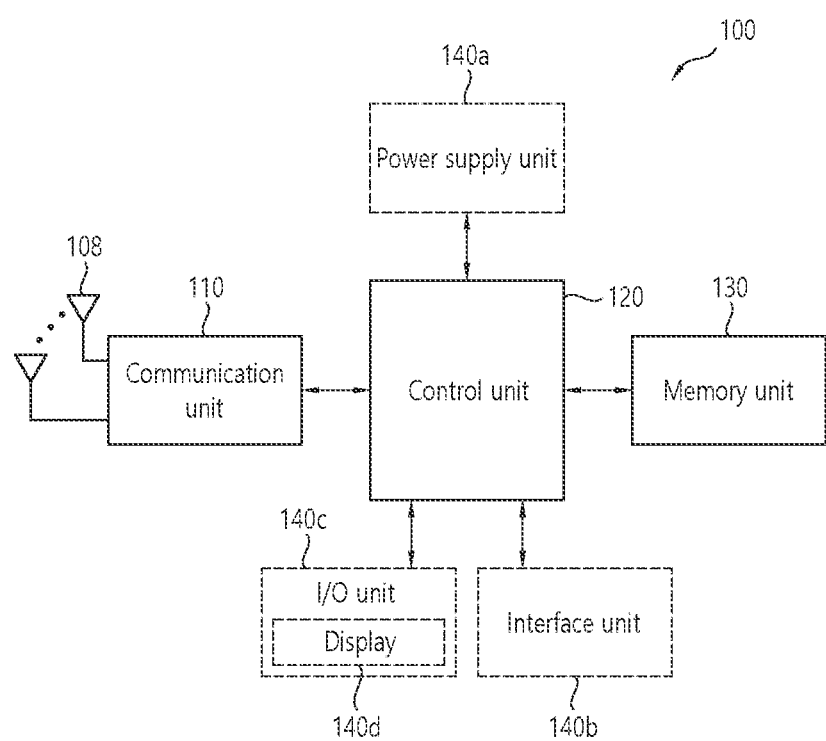
FIG. 20 shows a hand-held device, based on an embodiment of the present disclosure.

FIG. 20 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 20, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 19, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/ signals. The restored information/signals may be stored in the memory unit 130 and may be output as various types (e.g., text, voice, images, video, or haptic) through the I/O unit 140c.

Figure 21:
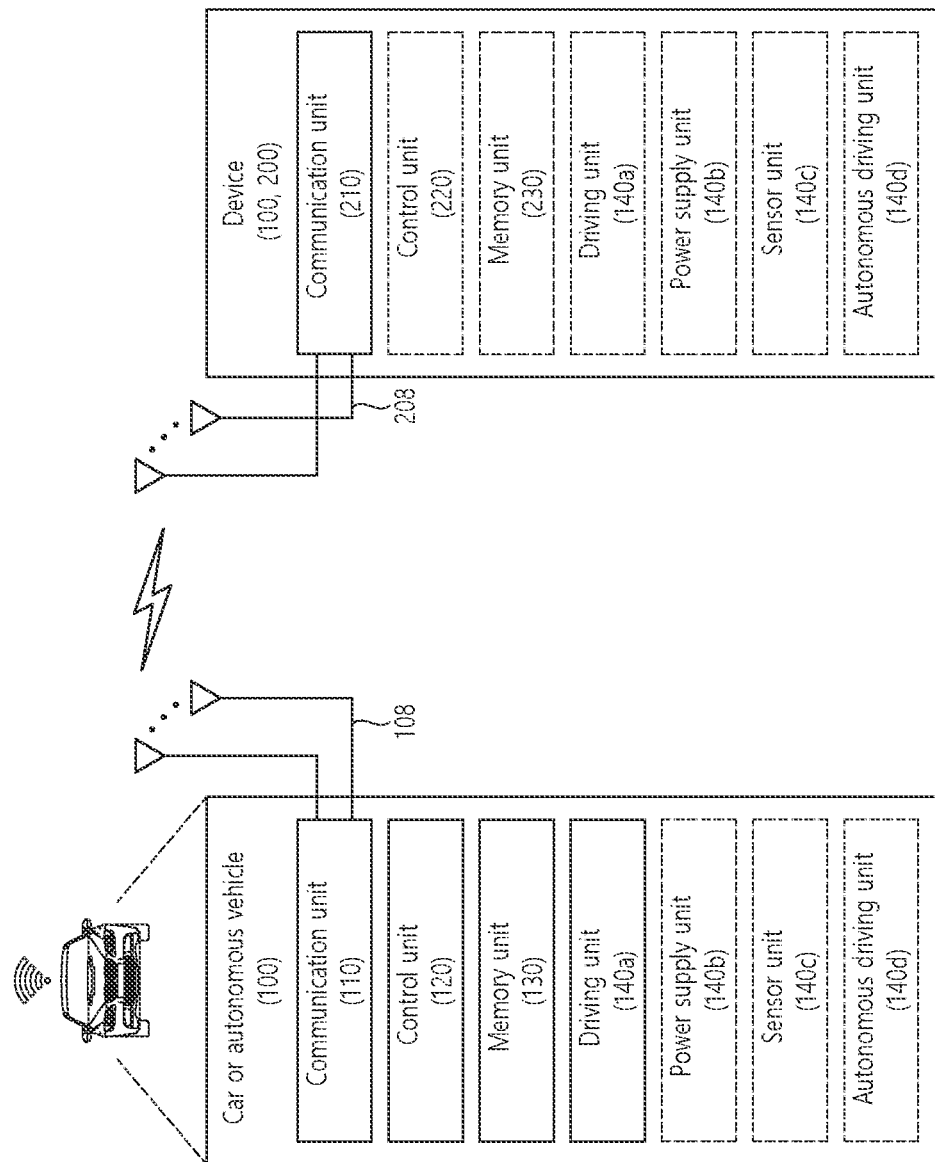
FIG. 21 shows a vehicle or an autonomous vehicle, based on an embodiment of the present disclosure.

FIG. 21 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 21, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 19, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method performed by a first device, the method comprising:
monitoring, based on a carrier indicator field (CIF) value, at least one physical downlink control channel (PDCCH) candidate in a search space;
receiving, through a PDCCH on a cell, downlink control information (DCI) for scheduling of a sidelink resource; and
performing sidelink communication with a second device based on the sidelink resource,
wherein, based on that the sidelink resource scheduled by the DCI monitored on the cell is in a scheduled cell, the CIF value is a CIF value related to the scheduled cell, and
wherein, based on that the sidelink resource scheduled by the DCI monitored on the cell is in an unlicensed band used for sidelink, the CIF value is zero.

2. The method of claim 1, wherein the CIF value related to the scheduled cell is a value other than zero.

3. The method of claim 1, wherein the unlicensed band includes an intelligent transport system (ITS) dedicated carrier.

4. The method of claim 1, further comprising:
determining the CIF value for monitoring at least one PDCCH candidate based on whether the sidelink resource scheduled by the DCI monitored on the cell is in the scheduled cell or the unlicensed band.

5. The method of claim 1, wherein the sidelink resource scheduled by the DCI monitored on the cell is a sidelink resource for new radio (NR) sidelink communication.

6. The method of claim 1, wherein, based on that the sidelink resource scheduled by the DCI monitored on the cell is in the unlicensed band used for sidelink, the CIF value is a value other than the CIF value related to the scheduled cell.

7. The method of claim 1, wherein, based on that (i) the sidelink resource scheduled by the DCI monitored on the cell is a sidelink resource for long term evolution (LTE) sidelink communication and (ii) the sidelink resource scheduled by the DCI monitored on the cell is in the scheduled cell, the CIF value is zero.

8. The method of claim 1, wherein cross carrier scheduling is performed from the cell to the scheduled cell.

9. A first device, comprising:
at least one transceiver;
at least one processor; and
at least one memory connected to the at least one processor and storing instructions that, based on being executed by the at least one processor, cause the first device to perform operations comprising:
monitoring, based on a carrier indicator field (CIF) value, at least one physical downlink control channel (PDCCH) candidate in a search space;

receiving, through a PDCCH on a cell, downlink control information (DCI) for scheduling of a sidelink resource; and performing sidelink communication with a second device based on the sidelink resource, wherein, based on that the sidelink resource scheduled by the DCI monitored on the cell is in a scheduled cell, the CIF value is a CIF value related to the scheduled cell, and wherein, based on that the sidelink resource scheduled by the DCI monitored on the cell is in an unlicensed band used for sidelink, the CIF value is zero.

10. The first device of claim 9, wherein the CIF value related to the scheduled cell is a value other than zero.

11. The first device of claim 9, wherein the unlicensed band includes an intelligent transport system (ITS) dedicated carrier.

12. The first device of claim 9, wherein the operations further comprising:

determining the CIF value for monitoring at least one PDCCH candidate based on whether the sidelink resource scheduled by the DCI monitored on the cell is in the scheduled cell or the unlicensed band.

13. The first device of claim 9, wherein the sidelink resource scheduled by the DCI monitored on the cell is a sidelink resource for new radio (NR) sidelink communication.

14. The first device of claim 9, wherein, based on that the sidelink resource scheduled by the DCI monitored on the cell is in the unlicensed band used for sidelink, the CIF value is a value other than the CIF value related to the scheduled cell.

15. A processing device, comprising:

at least one processor; and at least one memory connected to the at least one processor and storing instructions that, based on being executed by the at least one processor, cause a first device to perform operations comprising:

monitoring, based on a carrier indicator field (CIF) value, at least one physical downlink control channel (PDCCH) candidate in a search space;

receiving, through a PDCCH on a cell, downlink control information (DCI) for scheduling of a sidelink resource; and performing sidelink communication with a second device based on the sidelink resource, wherein, based on that the sidelink resource scheduled by the DCI monitored on the cell is in a scheduled cell, the CIF value is a CIF value related to the scheduled cell, and wherein, based on that the sidelink resource scheduled by the DCI monitored on the cell is in an unlicensed band used for sidelink, the CIF value is zero.

16. The processing device of claim 15, wherein the CIF value related to the scheduled cell is a value other than zero.

17. The processing device of claim 15, wherein the unlicensed band includes an intelligent transport system (ITS) dedicated carrier.

18. The processing device of claim 15, wherein the operations further comprising:

determining the CIF value for monitoring at least one PDCCH candidate based on whether the sidelink resource scheduled by the DCI monitored on the cell is in the scheduled cell or the unlicensed band.

19. The processing device of claim 15, wherein the sidelink resource scheduled by the DCI monitored on the cell is a sidelink resource for new radio (NR) sidelink communication.

20. The processing device of claim 15, wherein, based on that the sidelink resource scheduled by the DCI monitored on the cell is in the unlicensed band used for sidelink, the CIF value is a value other than the CIF value related to the scheduled cell.

* * * * *